United States Patent
Shim et al.

(10) Patent No.: US 12,335,640 B2
(45) Date of Patent: Jun. 17, 2025

(54) IMAGE SENSOR AND OPERATING METHOD THEREOF

(71) Applicant: Samsung Electronics Co., Ltd., Suwon-si (KR)

(72) Inventors: Eunsub Shim, Suwon-si (KR); Changhyun Park, Hwaseong-si (KR); Kyungho Lee, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 159 days.

(21) Appl. No.: 17/853,032

(22) Filed: Jun. 29, 2022

(65) Prior Publication Data

US 2023/0008501 A1   Jan. 12, 2023

(30) Foreign Application Priority Data

Jul. 7, 2021   (KR) .......................... 10-2021-0089205

(51) Int. Cl.
*H04N 25/53* (2023.01)
*H04N 25/42* (2023.01)
*H04N 25/75* (2023.01)
*H04N 25/77* (2023.01)

(52) U.S. Cl.
CPC ............ *H04N 25/53* (2023.01); *H04N 25/42* (2023.01); *H04N 25/75* (2023.01); *H04N 25/77* (2023.01)

(58) Field of Classification Search
None
See application file for complete search history.

(56) References Cited

U.S. PATENT DOCUMENTS

| | | | |
|---|---|---|---|
| 8,624,993 B2 | 1/2014 | Uchida et al. | |
| 8,654,231 B2 | 2/2014 | Kurokawa et al. | |
| 8,982,252 B2 | 3/2015 | Kishi | |
| 9,374,494 B2 | 6/2016 | Kubo et al. | |
| 9,628,729 B2 | 4/2017 | Makino et al. | |
| 10,484,634 B2 | 11/2019 | Kawazu et al. | |
| 10,796,622 B2 | 10/2020 | Chaji et al. | |
| 2007/0070222 A1 | 3/2007 | Wu | |
| 2011/0279705 A1* | 11/2011 | Kuang | H04N 25/134 348/E5.037 |

(Continued)

FOREIGN PATENT DOCUMENTS

| | | |
|---|---|---|
| JP | 2007/243876 A | 9/2007 |
| JP | 5059981 B2 | 10/2012 |

*Primary Examiner* — Twyler L Haskins
*Assistant Examiner* — Wesley J Chiu
(74) *Attorney, Agent, or Firm* — Harness, Dickey & Pierce, P.L.C.

(57) ABSTRACT

An image sensor and an operating method of the image sensor may include a pixel array including a plurality of pixels; a controller configured to generate a pre-shutter driving signal associated with a pre-shutter operation, the pre-shutter driving signal generated before a first shutter operation and a first read operation corresponding to photographing a first frame is performed; a row driver configured to drive first control signals to the pixel array based on the pre-shutter driving signal, the first control signals associated with the pre-shutter operation; and the pixel array is configured to perform the pre-shutter operation in response to the first control signals, wherein levels of the first control signals correspond to levels of second control signals, the second control signals associated with the first read operation.

19 Claims, 14 Drawing Sheets

(56) References Cited

U.S. PATENT DOCUMENTS

| | | | |
|---|---|---|---|
| 2012/0008027 A1* | 1/2012 | Makino | H04N 25/76 |
| | | | 348/E5.091 |
| 2012/0273655 A1 | 11/2012 | Ise | |
| 2016/0241784 A1* | 8/2016 | Baek | H04N 23/632 |
| 2016/0366357 A1 | 12/2016 | Shin | |
| 2016/0373667 A1* | 12/2016 | Kim | H04N 25/531 |
| 2017/0237914 A1* | 8/2017 | Cho | H04N 25/75 |
| | | | 348/241 |
| 2018/0353081 A1* | 12/2018 | Karimpour | G16H 20/17 |
| 2019/0116330 A1* | 4/2019 | Isobe | H04N 5/57 |
| 2020/0021769 A1* | 1/2020 | Niwa | H04N 25/40 |
| 2021/0029310 A1 | 1/2021 | Eom et al. | |

\* cited by examiner

IMAGE SENSOR AND OPERATING METHOD THEREOF

CROSS-REFERENCE TO RELATED APPLICATION

This U.S. non-provisional application is based on and claims the benefit of priority under 35 U.S.C. § 119 to Korean Patent Application No. § 119 to Korean Patent Application No. 10-2021-0089205, filed on Jul. 7, 2021, in the Korean Intellectual Property Office, the disclosure of which is incorporated by reference herein in its entirety.

BACKGROUND

Various example embodiments of the inventive concepts relate to an image sensor, and more particularly, to an image sensor, a system including the image sensor, and/or an operating method of the image sensor, etc.

An image sensor senses, obtains, and/or captures an image of an object by using a photoelectric conversion element that responds depending on the intensity of light reflected from the object, and generates image data based on the response of the photoelectric conversion element. Recently, with the development of complementary metal-oxide semiconductor (CMOS) technology, CMOS image sensors have been widely used.

A digital image processing apparatus including an image sensor may capture moving pictures in units of frames at regular time intervals. That is, the image sensor may generate a continuous moving picture by capturing a plurality of frames of images. In this case, when the operating conditions of the image sensor generating each frame are not kept constant and/or the image constituting each frame is distorted by noise, etc., the quality of the moving picture may be deteriorated.

SUMMARY

Various example embodiments of the inventive concepts provide an image sensor, a system including the image sensor, and/or an operating method of the image sensor, etc., for matching operating conditions of the image sensor in each frame period.

According to at least one example embodiment, an image sensor may include a pixel array including a plurality of pixels; a controller configured to generate a pre-shutter driving signal associated with a pre-shutter operation, the pre-shutter driving signal generated before a first shutter operation and a first read operation corresponding to photographing a first frame is performed; a row driver configured to drive first control signals to the pixel array based on the pre-shutter driving signal, the first control signals associated with the pre-shutter operation; and the pixel array is configured to perform the pre-shutter operation in response to the first control signals, wherein levels of the first control signals correspond to levels of second control signals, the second control signals associated with the first read operation.

According to at least one example embodiment, an operating method of an image sensor may include receiving a first command, the first command being a command for capturing at least a first frame; switching the image sensor to a wake-up mode from a sleep mode in response to the first command; performing a pre-shutter operation before capturing the first frame before a main shutter operation and a main read operation, the pre-shutter operation performed in response to first control signals, levels of the first control signals corresponding to levels of second control signals, the second control signals corresponding to a main read operation; and performing the main shutter operation and the main read operation for capturing the first frame using the image sensor in response to the pre-shutter operation.

According to at least one example embodiment, an image sensor may include a pixel array including a plurality of pixels; a row driver configured to generate driving signals for the plurality of pixels; and a controller configured to receive a request signal for capturing a plurality of frames from at least one processor, the plurality of frames including at least a first frame and a second frame, generate a first control signal, a second control signal, and a third control signal, and the pixel array configured to output a dummy signal in response to the first control signal, output a first pixel signal corresponding to the first frame in response to the second control signal, and output a second pixel signal corresponding to the second frame in response to the third control signal, wherein the dummy signal is a signal generated by residual electrons in the pixel array.

BRIEF DESCRIPTION OF THE DRAWINGS

Various example embodiments of the inventive concepts will be more clearly understood from the following detailed description taken in conjunction with the accompanying drawings in which.

DETAILED DESCRIPTION

Hereinafter, various example embodiments of the inventive concepts will be described in detail with reference to accompanying drawings.

Figure 1:
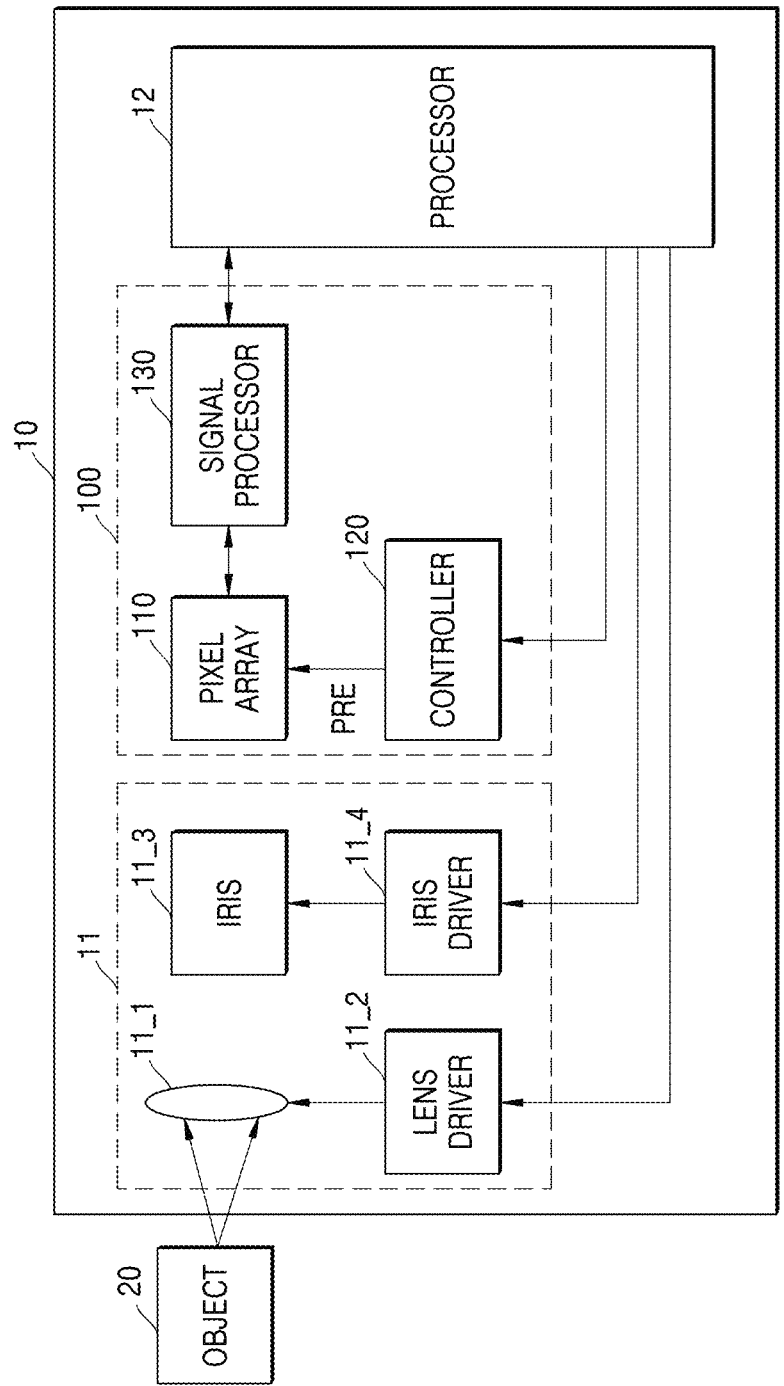
FIG. 1 is a block diagram showing the structure of a digital imaging apparatus according to at least one example embodiment of the inventive concepts.

FIG. 1 is a block diagram showing the structure of a digital imaging apparatus according to at least one example embodiment of the inventive concepts.

Referring to FIG. 1, a digital imaging device 10 according to at least one example embodiment of the inventive concepts may include at least one imaging unit 11, at least one image sensor 100, and/or at least one processor 12, etc., but the example embodiments are not limited thereto, and for example, the digital image device 10 may include a greater or lesser number of constituent components, such as memory, etc. Additionally, the digital imaging device 10 may have a video recording function, etc.

The at least one processor 12 may control the overall operation of the digital imaging device 10, but is not limited thereto. The processor 12 may provide a control signal for operating each component, such as a lens driver 11_2, an aperture driver 11_4, and/or a controller 120, and the like, but is not limited thereto. According to some example embodiments, the processor 12 (e.g., processing circuitry) may include hardware, such as processors, processor cores, logic circuits, storage devices, etc.; a hardware/software combination such as at least one processor core executing software and/or executing any instruction set, etc.; or a combination thereof. For example, the processing circuitry more specifically may include, but is not limited to, a field programmable gate array (FPGA), a programmable logic unit, an application-specific integrated circuit (ASIC), s System-on-Chip (SoC), etc. Additionally, according to some example embodiments, the processing circuitry may further include the image sensor 100 and/or at least one of the controller 120 and/or signal processor 130, etc.

The imaging unit 11 is a component that receives light, and may include a lens 11_1, a lens driver 11_2, an iris 11_3, and/or an iris driver 11_4, etc., but is not limited thereto. The lens 11_1 may include a plurality of lenses, etc., but is not limited thereto.

The lens driver 11_2 may exchange information regarding focus detection with the processor 12, and may adjust the position of the lens 11_1 depending on at least one control signal provided from the processor 12. The lens driver 11_2 may move the lens 11_1 in directions in which the distance from the object 20 increases or decreases. Accordingly, the distance between the lens 11_1 and the object 20 may be adjusted. Depending on the position of the lens 11_1, the object 20 may be focused or blurred.

The image sensor 100 may convert incident light into an image signal. The image sensor 100 may include a pixel array 110, the controller 120, and/or a signal processor 130, etc., but the example embodiments are not limited thereto. An optical signal passing through the lens 11_1 and the iris 11_3 may reach a light-receiving surface of the pixel array 110 to form an image of the subject.

The pixel array 110 may be a complementary metal oxide semiconductor image sensor (CIS) that converts the optical signal into an electrical signal, but the example embodiments are not limited thereto. The sensitivity of the pixel array 110 may be adjusted by the controller 120. The pixel array 110 may include a plurality of pixels that convert an optical signal (e.g., an optical signal corresponding to light reflecting off at least one object) into an electrical signal. Each of the plurality of pixels may generate a pixel signal depending on, corresponding to, and/or based on a sensed light intensity.

The image sensor 100 may provide image information to the processor 12, and the processor 12 may process the image information, but is not limited thereto.

The processor 12 may reduce noise with respect to an input signal (e.g., the input image information received from the image sensor 100, etc.), and perform image signal processing for image quality improvement such as gamma correction, color filter array interpolation, color matrix, color correction, and/or color enhancement, etc., but is not limited thereto. In addition, the processor 12 may compress image data generated by image signal processing for image quality improvement to generate an image file, and/or may restore image data from the image file, etc.

The processor 12 may control the image sensor 100 to capture a video including a plurality of frames (e.g., image frames, video frames, etc.). For example, the processor 12 may generate a video recording request signal (e.g., instruction, command, etc.) and transmit the video recording request signal to the image sensor 100, etc. Before the image sensor 100 receives the video recording request signal from the processor 12, the image sensor 100 may operate in a power save mode and/or a sleep mode, but is not limited thereto. The image sensor 100 may receive a video recording request signal from the processor 12 and operate in a wake-up mode (and/or full power operating mode, etc.). The image sensor 100 may generate control signals for photographing a plurality of frames in the wake-up mode. The image sensor 100 may sequentially transmit an image signal generated by photographing each frame to the processor 12, and the processor 12 may generate a video based on the image signal. The image sensor 100 may generate an image signal for one frame (e.g., a single frame of the plurality of frames of the video) by sequentially performing a shutter operation and a read operation. In order to photograph a video composed of a plurality of frames, the image sensor 100 may repeatedly perform a plurality of shutter operations and read operations, etc.

The image sensor 100 may capture a first frame of the video after being switched from the power save mode and/or the sleep mode to the wake-up mode. In this case, residual electrons accumulated during the power save mode and/or the sleep mode may be present in the pixel array 110. For this reason, the state of the pixel array 110 photographing the first frame and the state of the pixel array 110 photographing the second frame may be different from each other. Moreover, these residual electrons may affect the image signal for the first frame and therefore may cause a deterioration of the image quality of the video.

Figure 6:
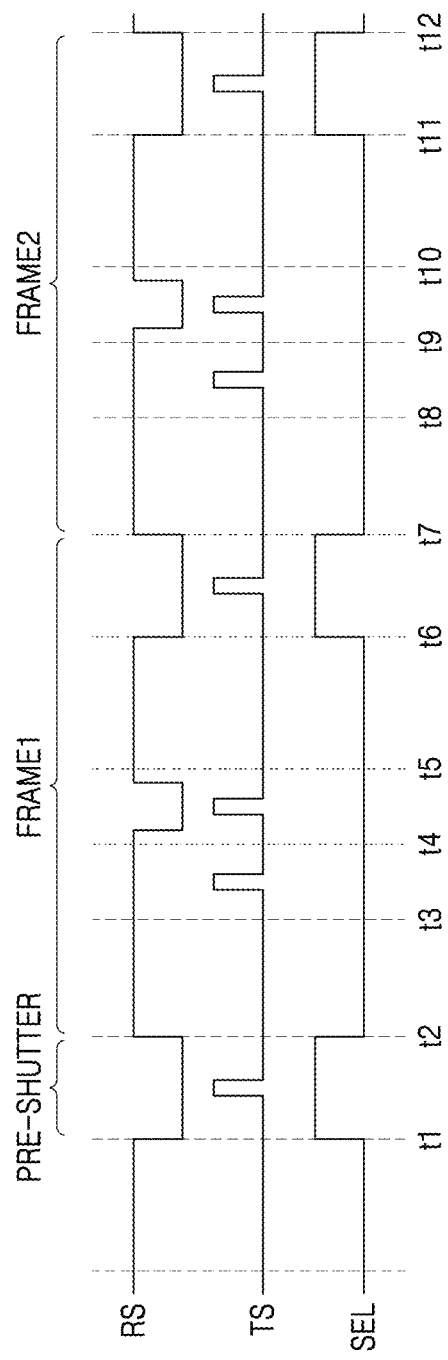
FIG. 6 is a timing diagram illustrating control signals according to at least one example embodiment of the inventive concepts.

Also, referring to FIG. 6, the second frame and subsequent frames may include a non-effective integration time (NIT) period. In the corresponding NIT period, an effect may occur due to electrons not moving from the photodiode to a floating diffusion of the image sensor 100. Accordingly, because the first frame does not include the NIT period, the operating conditions of the subsequent frames may be different from the first frame. As a result, a color difference between the color of the first frame and the color of the second frame (and/or subsequent frames) may occur, thus causing a deterioration of the image quality of the video.

According to at least one example embodiment of the inventive concepts, the image sensor 100 may process the residual electrons of the pixel array 110 by performing a pre-shutter operation before capturing, sensing, and/or photographing the first frame, etc., but the example embodiments are not limited thereto, and for example, the pre-shutter operation may occur before other frames, etc. The controller 120 may generate a pre-shutter driving signal PRE for a pre-shutter operation and provide the pre-shutter driving signal PRE to the pixel array 110. As the image sensor 100 performs the pre-shutter operation, the operating conditions of the first frame are unified with the operating conditions of subsequent frames to obtain images of stable quality, and therefore the video does not experience image deterioration due to color differences between frames, etc.

According to at least one example embodiment, an operation for photographing the first frame and subsequent frames of an image after the pre-shutter operation may be referred to as a main shutter operation and a main read operation. For example, the image sensor 100 may sequentially perform a pre-shutter operation, a first main shutter operation and a first read operation for the first frame, and a second main shutter operation and a second read operation for the second frame, etc., but is not limited thereto.

Figure 2:
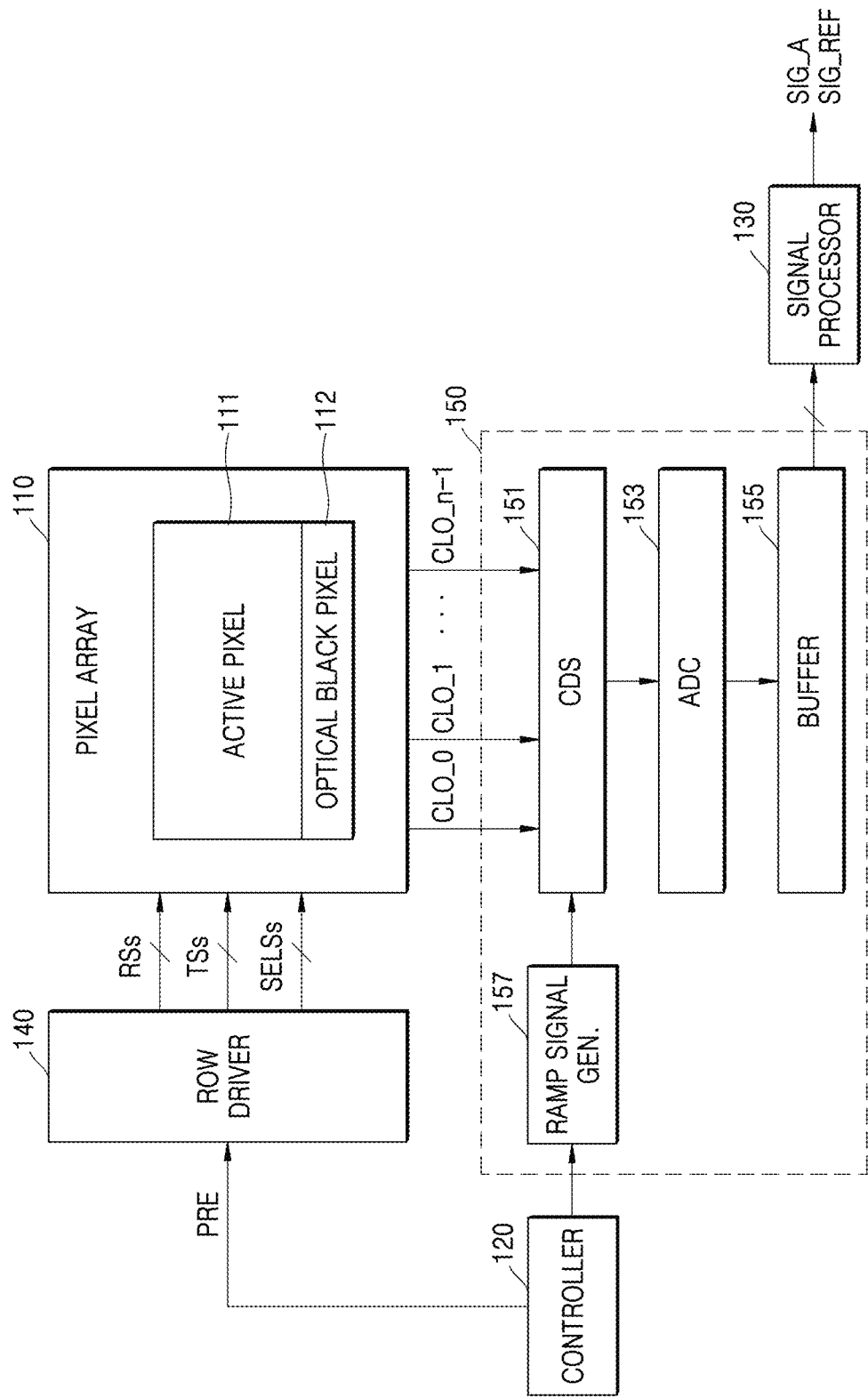
FIG. 2 is a block diagram illustrating the configuration of an image sensor according to at least one example embodiment of the inventive concepts.

FIG. 2 is a block diagram illustrating the configuration of an image sensor according to at least one example embodiment of the inventive concepts.

Referring to FIG. 2, an image sensor 100 may include a pixel array 110, a controller 120, a signal processor 130, a row driver 140, and/or a signal reader 150, etc., but is not limited thereto.

The pixel array 110 may include a plurality of row lines, a plurality of column lines, and a plurality of pixels arranged in a matrix form, each of the plurality of pixels being connected to a row line and a column line. The row lines may include a plurality of lines for transmitting a row selection signal and a pixel control signal to the connected pixel, etc.

Each pixel may include a photo-sensing element, and may sense light using the photo-sensing element, and convert the sensed light into a pixel signal that is an electrical signal. For example, the photo-sensing element may include a photodiode, a photo transistor, a port gate, and/or a pinned photodiode, etc. Each pixel may include at least one photo-sensing element, and in at least one example embodiment, each pixel may include a plurality of photo-sensing elements. The plurality of photo-sensing elements may be stacked on each other, but are not limited thereto.

According to at least one example embodiment of the inventive concepts, the pixel array 110 may include an active pixel 111 and/or an optical black pixel 112, etc., but is not limited thereto, and for example, may include a greater or lesser number of active pixels and/or optical black pixels, etc. The active pixel 111 may refer to a pixel that generates a pixel signal (hereinafter referred to as an active signal SIG_A) corresponding to wavelengths of light received from the outside (e.g., an external source, etc.). The optical black pixel 112 may block light from the outside (e.g., block light from the external source, etc.). The optical black pixel 112 may generate a pixel signal (hereinafter, referred to as a reference signal SIG_REF) by measuring a dark current and/or measuring noise caused by supply power, but is not limited thereto.

According to at least one example embodiment, the pixel array 110 may include a plurality of pixels sharing one floating diffusion (e.g., sharing a single floating diffusion), but the example embodiments are not limited thereto. Such a pixel may be referred to as a pixel having a shared structure.

According to at least one example embodiment, each pixel of the pixel array 110 may operate in a full-mode, but is not limited thereto. According to at least one example embodiment, at least two or more pixels of the pixel array 110 may operate in a binning-mode, but are not limited thereto. In the binning-mode, the image sensor 100 may sum pixel signals output from a plurality of pixels, etc.

The controller 120 may cause the pixel array 110 to absorb light to accumulate charges and/or to temporarily store the accumulated charges, and may control the row driver 140 to output an electrical signal depending on, corresponding to, and/or based on the stored charges to the outside of the pixel array 110 (e.g., output the electrical signal to an external source), etc. Also, the controller 120 may control the signal reader 150 to measure the level of the pixel signal (e.g., determine the pixel value, etc.) provided by the pixel array 110.

The controller 120 according to at least one example embodiment of the inventive concepts may generate a pre-shutter driving signal PRE so that each component of the image sensor 100 performs a pre-shutter operation. For example, the controller 120 transmits the pre-shutter driving signal PRE to the row driver 140 before photographing the first frame, thereby causing the pixel array 110 to perform the pre-shutter operation. Although not shown, the controller 120 may generate a driving signal for photographing the first and second frames after the pre-shutter operation and further provide the driving signal to the row driver 140, but the example embodiments are not limited thereto, and for example, there may be three or more frames photographed and/or captured after the pre-shutter operation, etc.

The signal reader 150 may include a correlated-double sampling (CDS) 151, an analog-digital converter (ADC) 153, and/or a buffer 155, etc., but the example embodiments are not limited thereto.

The CDS 151 may sample and hold the pixel signal provided from the pixel array 110. According to some example embodiments, the CDS 151 may double-sample a specific noise level and/or a level depending on and/or based on the pixel signal, and output a level corresponding to the difference, etc. Also, the CDS 151 may receive the ramp signal generated by a ramp signal generator 157, compare the pixel signal with the ramp signal, and output a comparison result. The ADC 153 may convert an analog signal corresponding to a level received from the CDS 151 into a digital signal. The buffer 155 may latch a digital signal, and the latched signal may be sequentially output to a signal processor 130 and/or outside of (e.g., external to) the image sensor 100, etc.

According to at least one example embodiment of the inventive concepts, a pixel signal generated through a pre-shutter operation and a pixel signal generated through a main shutter operation may be output to the signal reader 150. Because the pixel signal generated through the pre-shutter operation does not constitute an image frame, the pixel signal may be referred to as a dummy signal, but is not limited thereto. The pixel signal generated by the pixel array 110 may be output to the signal reader 150 through first to n-th column output lines CLO_0 to CLO_n−1. For example, a pixel signal generated by the active pixel 111 and a pixel signal generated by the optical black pixel 112 may be output to the signal reader 150, etc.

The row driver 140 may generate a plurality of control signals RSs, TSs, and SELSs for controlling the pixel array 110 and provide the control signals to a plurality of pixels PX. The row driver 140 may receive the pre-shutter driving signal PRE from the controller 120, and as a response, generate control signals so that a plurality of pixels of the pixel array 110 perform a pre-shutter operation, etc. In detail, the row driver 140 may determine activation and/or deactivation of reset control signals RSs, transfer control signals TSs, and/or selection signals SELSs provided to a plurality of pixels to perform a pre-shutter operation, etc. For example, before generating reset control signals RSs, transfer control signals TSs, and/or selection signals SELSs for photographing a first frame of a video, the row driver 140 may generate reset control signals RSs, transfer control signals TSs, and/or selection signals SELSs for performing a pre-shutter operation.

The signal processor 130 may perform signal processing based on pixel signals output from a plurality of received pixels, etc. For example, the signal processor 130 may perform noise reduction processing, gain adjusting, waveform shaping processing, interpolation processing, white balance processing, gamma processing, edge enhancement processing, and/or the like on the received pixels, etc., but the example embodiments are not limited thereto.

In at least one example embodiment, the signal processor 130 may perform signal processing based on the active signal SIG_A and the reference signal SIG_REF respectively generated in the active pixel 111 and the optical black pixel 112 through the pre-shutter operation. For example, the signal processor 130 may generate a difference signal based on a difference between the active signal SIG_A and the reference signal SIG_REF. On the other hand, in FIGS. 1 and 2, the signal processor 130 is illustrated as being included in the image sensor 100, but the example embodiments are not limited thereto, and the signal processor 130 may be included in a processor, for example, the processor 12 in FIG. 1, etc. In this case, the signal processor 130 may provide the active signal SIG_A and the reference signal SIG_REF to the processor 12, etc.

Figure 3:
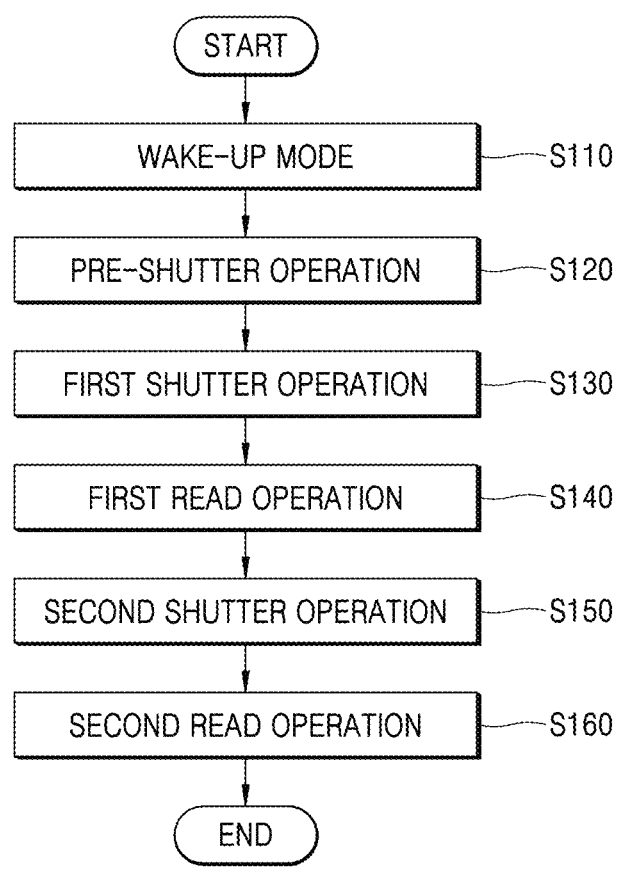
FIG. 3 is a flowchart illustrating a method of operating an image sensor according to at least one example embodiment of the inventive concepts.

FIG. 3 is a flowchart illustrating an operation of an image sensor according to at least one example embodiment of the inventive concepts.

Referring to FIGS. 2 and 3 together, in operation S110, the image sensor 100 may operate in a wake-up mode, but is not limited thereto. As an example, the image sensor 100 may be switched from a power save mode and/or a sleep mode to the wake-up mode in response to the video recording request signal received from the processor 12 of FIG. 1, etc., but the example embodiments are not limited thereto, and for example, the S110 operation may be omitted if the image sensor 100 is not in a power save mode and/or sleep mode, etc.

In operation S120, the controller 120 of the image sensor 100 may transmit a pre-shutter driving signal to cause the pixel array 110 to perform a pre-shutter operation. As an example, the controller 120 may transmit the pre-shutter driving signal to the row driver 140 and/or the pixel array 110 of the image sensor 100 such that the pixel array 110 performs the pre-shutter operation before photographing, sensing, and/or capturing the first frame, but the example embodiments are not limited thereto. For example, controller 120 may control each of the active pixel 111 and the optical black pixel 112 to perform the pre-shutter operation, etc.

In operation S130, the controller 120 may transmit a first shutter driving signal to the row driver 140 and/or pixel array 110 of the image sensor 100 to cause the pixel array 110 to perform a first shutter operation for photographing a first frame of the video. For example, the first frame may correspond to the first frame of the video. Through the first shutter operation, effective photocharges may start to accumulate in a floating diffusion of each pixel.

In operation S140, the controller 120 may transmit a read operation driving signal to the row driver 140 and/or pixel array 110 of the image sensor 100 to cause the pixel array 110 of the to perform a first read operation on the first frame of the video. For example, when the pixel signal is generated by the effective photocharges accumulated after the first shutter operation, the pixel signal may be output through the signal reader 150 through the first read operation, etc. For example, the active signal SIG_A and the reference signal SIG_REF for the first frame may be respectively output.

In operation S150, the controller 120 may transmit a second shutter operation driving signal to the row driver 140 and/or pixel array 110 of the image sensor 100 to cause the pixel array 110 to perform a second shutter operation for sensing, capturing, and/or photographing a second frame of the video. For example, the second frame may correspond to the second frame of the video after the first frame, but is not limited thereto. The photocharges accumulated in the floating diffusion of each pixel may be moved through the first read operation, and through the second shutter operation, effective photocharges may be accumulated again in the floating diffusion of each pixel, etc.

In operation S160, the controller 120 may transmit a second read operation driving signal to the row driver 140 and/or pixel array 110 of the image sensor 100 to cause the pixel array 110 to perform a second read operation on the second frame of the video. For example, when the pixel signal is generated by the effective photocharges accumulated after the second shutter operation, the pixel signal may be output through the signal reader 150 through the second read operation, etc. For example, the active signal SIG_A and the reference signal SIG_REF for the second frame may be respectively output, etc.

In addition, with reference to photographing frame of a video, a first and second shutter operations for generating an image signal may be referred to as a main shutter operation, and first and second read operations may be referred to as a main read operation.

According to at least one example embodiment, the controller 120 may sequentially and/or repeatedly transmit driving signals corresponding to the main shutter operation and the main read operation to the row driver 140 and/or pixel array 110 of the image sensor 100 to cause the pixel array 110 to sequentially repeat the main shutter operation and the main read operation until a request signal for terminating video recording is received, etc., but is not limited thereto.

In addition, the pre-shutter operation may be performed a plurality of times in one video sensing, capturing, and/or photographing operation. For example, the pre-shutter operation may be performed before photographing the first frame, and may be performed again after photographing frames a desired and/or predetermined number of times.

Figure 4:
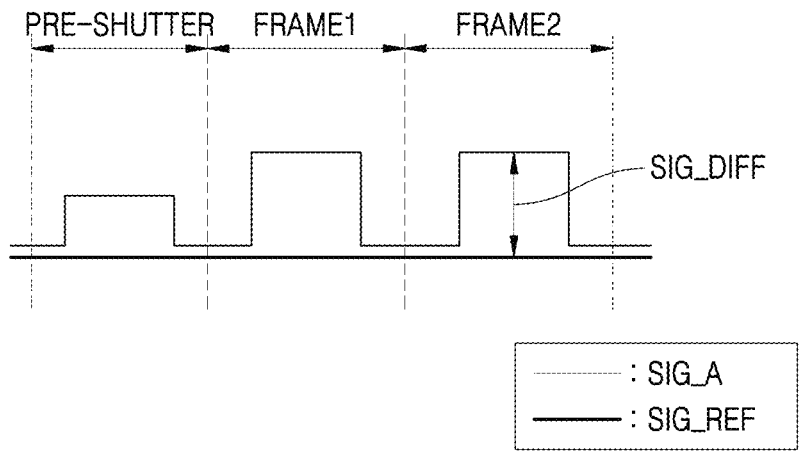
FIG. 4 is an example diagram illustrating a signal according to at least one example embodiment of the inventive concepts.

FIG. 4 is an example diagram illustrating a signal according to at least one example embodiment of the inventive concepts.

Referring to FIGS. 2 and 4 together, the active pixel 111 and the optical black pixel 112 may respectively output the active signal SIG_A and the reference signal SIG_REF depending on a control signal of the row driver 140, but are not limited thereto. The reference signal SIG_REF may be used to determine a reference black level. Meanwhile, each signal level in FIG. 4 are merely examples, and for example, the level of each signal may not be constant due to an external environment, noise, or the like.

In a pre-shutter period in which the pre-shutter operation is performed, an active signal SIG_A and a reference signal SIG_REF may be generated. The difference signal SIG_DIFF may be a signal generated based on a difference between the active signal SIG_A and the reference signal SIG_REF, but is not limited thereto. The active signal SIG_A of the pre-shutter period may include a signal due to residual electrons present in the floating diffusion of the active pixel 111. Due to the residual electrons, the driving environment of the active pixel 111 and the optical black pixel 112 may be changed and/or different. Accordingly, the reliability of the active signal SIG_A and the differential signal generated in the pre-shutter period may be low and/or reduced.

In the first frame period frame1 in which the first frame is photographed, the active signal SIG_A and the reference signal SIG_REF may be generated. As residual electrons are removed through the pre-shutter operation, the driving environments of the active pixel 111 and the optical black pixel 112 may be unified and therefore the image quality may be improved.

Similarly, in the second frame period frame2 in which the second frame is photographed, the active signal SIG_A and the reference signal SIG_REF may be generated. As residual electrons are removed through a read operation in the first frame period frame1, driving environments of the active pixel 111 and the optical black pixel 112 may be unified, etc.

That is, the pre-shutter operation may be similar to the read operation. By performing a read operation through a pre-shutter operation before photographing the first frame, the photographing environment of the first frame and the photographing environment of the second frame may be unified. Accordingly, a difference in color between the first frame and the second frame may be reduced and the image quality may be improved, etc.

Figure 5:
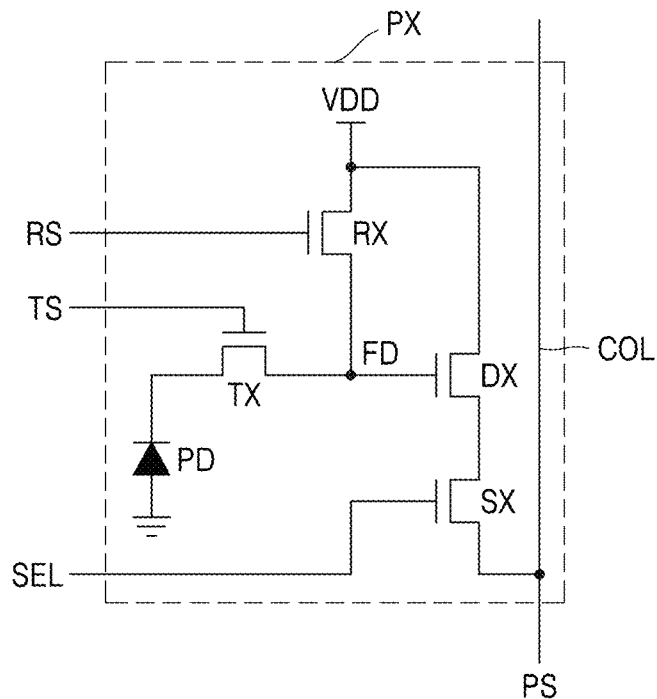
FIG. 5 is a circuit diagram of a pixel according to at least one example embodiment of the inventive concepts.

FIG. 5 is a circuit diagram of a pixel according to at least one example embodiment of the inventive concepts. The pixel PX of FIG. 5 may be at least one example embodiment of an active pixel 111 of FIG. 2 and/or an optical black pixel 112 of FIG. 2.

Referring to FIG. 5, the pixel PX may include a photodiode PD, a transfer transistor TX, a floating diffusion FD, a reset transistor RX, a drive transistor DX, and/or a selection transistor SX, etc., but is not limited thereto. The photodiode PD is an example of a photoelectric conversion element and may be replaced with other types of photoelectric conversion element, etc.

The photodiode PD generates photocharges that vary depending on, corresponding to, and/or based on the intensity of the incident light. The transfer transistor TX may transfer the photocharges to the floating diffusion FD depending on a transfer control signal TS provided from the row driver 140 of FIG. 2. The drive transistor DX may amplify and transmit the photocharges to the selection transistor SX based on a potential depending on the photocharges accumulated in the floating diffusion FD. The drain of the selection transistor SX is connected to the source of the drive transistor DX, and a pixel signal PS may be output to a column line COL connected to the pixel PX depending on the selection signal SEL output from the row driver 140. The reset transistor RX may reset the floating diffusion FD to a power supply voltage VDD level depending on and/or based on a reset control signal RS provided from the row driver 140, etc.

FIG. 5 illustrates a pixel PX having a 4T structure including one photodiode PD and four MOS transistors TX, RX, DX, and SX, but the structure of the pixel PX is not limited thereto. For example, the pixel PX may be implemented as 3T and 5T unit pixels, and the pixel PX may be implemented as a circuit including a photoelectric conversion element that generates photocharges depending on and/or based on the amount of light and/or intensity of light and at least one transistor capable of outputting the photocharges generated by the photoelectric conversion element as a current and/or voltage signal, etc., but the example embodiments are not limited thereto.

FIG. 6 is a timing diagram illustrating control signals according to at least one example embodiment of the inventive concepts. In the timing diagram of FIG. 6, when the signal is at a logic high level, it is referred to as active, and when the signal is at a logic low level, it is referred to as inactive. In addition, the transfer control signal TS may be in the form of a pulse having shorter width than that of the reset control signal RS and the selection signal SEL, but the example embodiments are not limited thereto. Therefore, in the following example embodiments, it is described that the transfer transistor TX is turned on by activating the transfer control signal TS, and the transfer transistor TX is turned off by deactivating the transfer control signal TS immediately after a time corresponding to the pulse width passes, etc.

Referring to FIGS. 2, 5, and 6 together, the image sensor 100 may operate in a wake-up mode before a first time point t1. In the wake-up mode, the reset control signal RS may be active, and the transfer control signal TS and the selection signal SEL may be inactive, but are not limited thereto. Accordingly, the reset transistor RX may be turned on, and the transfer transistor TX and the selection transistor SX may be turned off, etc. Residual electrons may be accumulated in the pixel array 110 until the first time point t1, and thereafter, the residual electrons may be removed through a pre-shutter operation, etc.

In the pre-shutter period t1 to t2, the reset control signal RS may be deactivated (e.g., set to be inactive, set to a low level and/or logical low level, etc.), and the transfer control signal TS and the selection signal SEL may be activated (e.g., set to high levels and/or logical high levels, etc.). Accordingly, the reset transistor RX may be turned off, and the transfer transistor TX and the selection transistor SX may be turned on, but the example embodiments are not limited thereto.

At second to third time points t2 to t3, the reset control signal RS may be active (e.g., may be activated, set to a high level, set to a logical high level, etc.), and the transfer control signal TS and the selection signal SEL may be inactive (e.g., may be deactivated, set to a low level, set to a logical low level, etc.). Accordingly, the reset transistor RX may be turned on, and the transfer transistor TX and the selection transistor SX may be turned off, but the example embodiments are not limited thereto.

At third to fourth time points t3 to t4, the reset control signal RS and the selection signal SEL may be maintained, and the transfer control signal TS may be activated, etc. Accordingly, the reset transistor RX may remain turned on, the transfer transistor TX may be turned on, and the selection transistor SX may remain turned off, but the example embodiments are not limited thereto.

At fourth to fifth time points t4 to t5, the reset control signal RS may be deactivated, the transfer control signal TS may be activated, and the selection signal SEL may remain inactive, etc. Accordingly, the reset transistor RX may be turned off, the transfer transistor TX may be turned on, and the selection transistor SX may remain turned off, but the example embodiments are not limited thereto.

At fifth to sixth time points t5 to t6, the reset control signal RS may be activated, and the transfer control signal TS and the selection signal SEL may be deactivated, etc. Accordingly, the reset transistor RX may be turned on, and the transfer transistor TX and the selection transistor SX may be turned off, but the example embodiments are not limited thereto.

At sixth to seventh time points t6 to t7, the reset control signal RS may be deactivated, and the transfer control signal TS and the selection signal SEL may be activated, etc.

Accordingly, the reset transistor RX may be turned off, and the transfer transistor TX and the selection transistor SX may be turned on, but the example embodiments are not limited thereto.

According to at least one example embodiment, operations (e.g., the levels, logic levels, and/or the pulse width) of the control signals (e.g., second control signals associated with and/or corresponding to a first read operation, etc.) at the sixth to seventh time points t6 to t7 may be similar to, substantially similar to (e.g., within +/-10% of the levels and/or the pulse width), and/or correspond to the operations (e.g., the levels, logic levels, and/or the pulse width) of the control signals (e.g., first control signals associated with and/or corresponding to a pre-shutter operation, etc.) in the pre-shutter period t1 to t2 (e.g., the control signals may be set to the same levels and pulse widths and/or substantially same levels and pulse widths as the pre-shutter period t1 to t2, etc.), but is not limited thereto. That is, the pre-shutter operation may be similar to, substantially similar to, and/or correspond to the main read operation, etc.

In a first frame period t2 to t7, the second to third time points t2 to t3 may correspond to an NIT period, the third to fifth time points t3 to t5 may correspond to the shutter period, the fifth to sixth time points t5 to t6 may correspond to an effective integration time (EIT) period, and the sixth to seventh time points t6 to t7 may correspond to the read period, etc. As an example, the main shutter operation may be performed in the shutter period, and the main read operation may be performed in the read period, but the example embodiments are not limited thereto.

According to at least one example embodiment, the second to third time points t2 to t3 may include the NIT period. According to at least one example embodiment of the inventive concepts, because the pre-shutter period t1 to t2 exists, the NIT period may be included in the first frame period t2 to t7. That is, the first frame period t2 to t7 may sequentially include the NTT period, for example, the second to third time points (e.g., t2 to t3), generated through the pre-shutter operation, a shutter period, for example, the third to fifth time points (e.g., t3 to t5), in which the first shutter operation is performed, and a read period, for example, the sixth to seventh time points (e.g., t6 to t7), in which the first signal generated by the first shutter operation is read, but the example embodiments are not limited thereto. Accordingly, the operating conditions and/or operating environments of the first frame period t2 to t7 and the second frame period t7 to t12 may match each other, etc., thereby increasing the image quality of the first frame and/or causing the first frame to have similar image quality as the second frame, etc.

Operations of the control signals in the second frame period t7 to t12 are similar to operations of the first frame period t2 to t7, and thus a description thereof is omitted.

Figure 7:
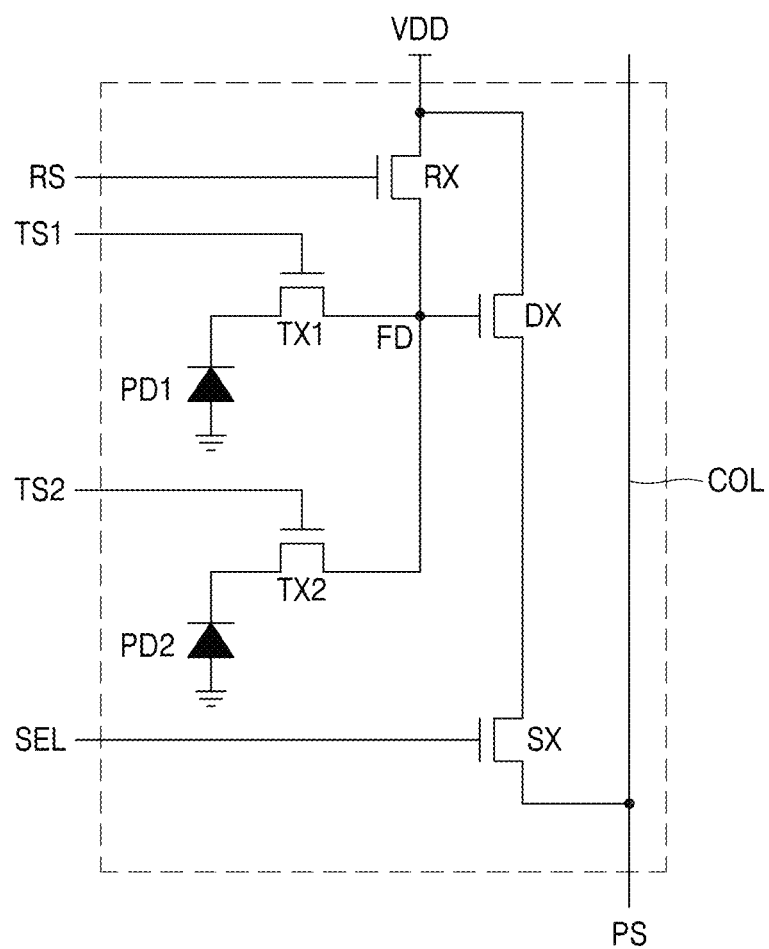
FIG. 7 is a circuit diagram of a pixel according to at least one example embodiment of the inventive concepts.

FIG. 7 is a circuit diagram of a pixel according to at least one example embodiment of the inventive concepts.

Referring to FIG. 7, the active pixel 111 and/or the optical black pixel 112 may each include a first pixel group GPX1 having a shared structure, but the example embodiments are not limited thereto. For example, the first pixel group GPX1 may include at least a first and second pixels having a shared structure, etc., but is not limited thereto.

A first pixel of the first pixel group GPX1 may include a first photodiode PD1, a first transfer transistor TX1, a selection transistor SX, a drive transistor DX, and/or a reset transistor RX, etc. The first transfer transistor TX1 may be controlled by a first transfer control signal TS1. A second pixel of the first pixel group GPX1 may include a second photodiode PD2, a second transfer transistor TX2, the selection transistor SX, the drive transistor DX, and/or the reset transistor RX, etc. The second transfer transistor TX2 may be controlled by a second transfer control signal TS2.

The first pixel and the second pixel may share a floating diffusion FD, and may share the selection transistor SX, the drive transistor DX, and the reset transistor RX, but the example embodiments are not limited thereto. In at least one example embodiment, at least one of the selection transistor SX, the drive transistor DF, and the reset transistor RX may be omitted.

Figure 8:
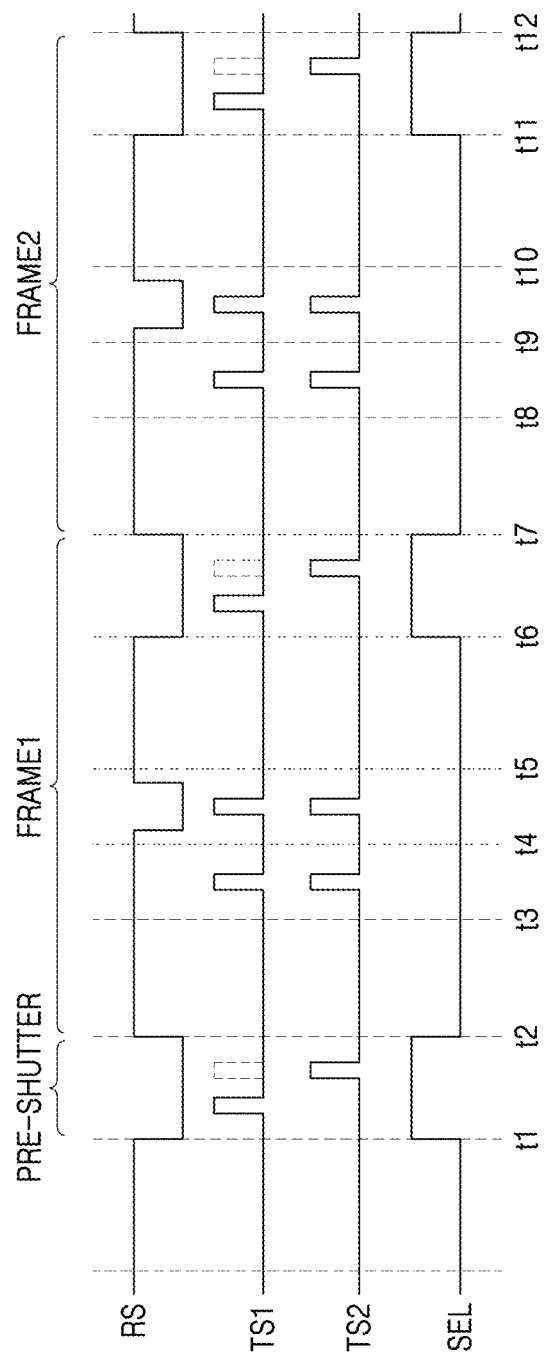
FIGS. 8 and 9 are timing diagrams illustrating control signals according to at least one example embodiment of the inventive concepts.
Figure 9:
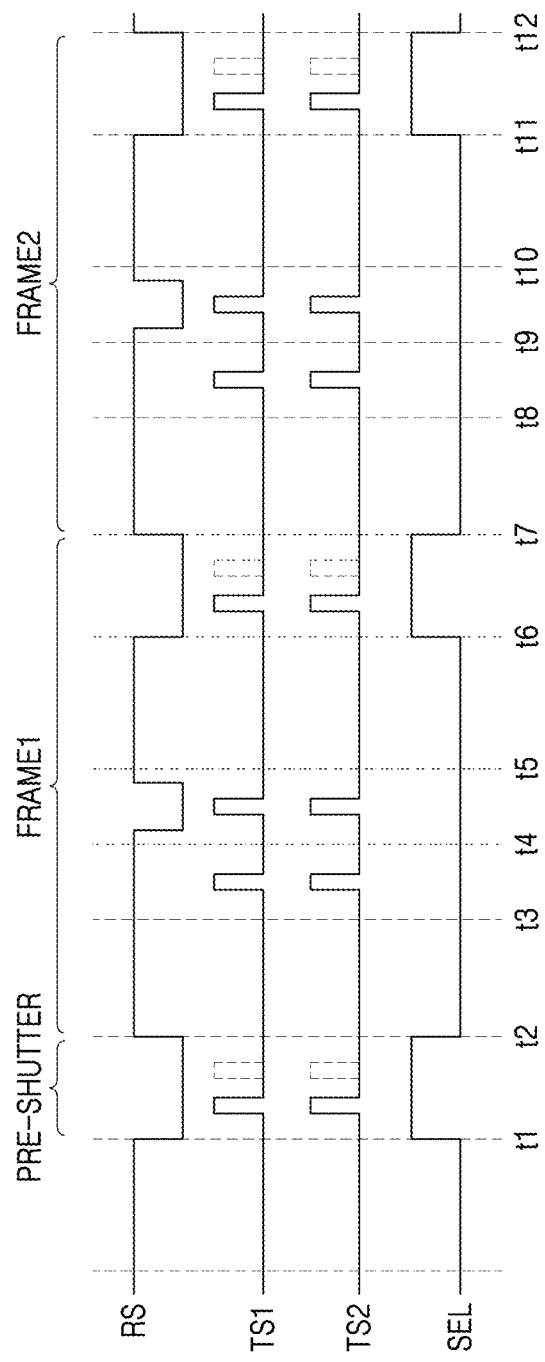

FIGS. 8 and 9 are timing diagrams illustrating control signals according to at least one example embodiment of the inventive concepts. The timing diagrams may indicate control signals for the first pixel group GPX1 of, for example, FIG. 7, but are not limited thereto. That is, the first and second transfer control signals TS1 and TS2 may control a photodiode of a pixel that is not a shared structure.

Referring to FIGS. 8 and 9 together, operations of the control signals may be similar to, for example, those of FIG. 6, and the descriptions already given are omitted, and descriptions are mainly of the pre-shutter period t1 to t2 and the sixth to seventh time points t6 to t7, but the example embodiments are not limited thereto.

In the pre-shutter period t1 to t2, the reset control signal RS may be deactivated, the first and second transfer control signals TS1 and TS2 may be activated, and the selection signal SEL may be activated, etc. Accordingly, the reset transistor RX may be turned off, and the first and second transfer transistors TX1 and TX2 and the selection transistor SX may be turned on, but the example embodiments are not limited thereto.

Referring to FIG. 8 as an example, in the pre-shutter period t1 to t2, the first and second transfer control signals TS1 and TS2 may be sequentially activated, but the example embodiments are not limited thereto. Accordingly, the first and second transfer transistors TX1 and TX2 may be sequentially turned on. That is, the first transfer transistor TX1 may be driven during the first period, and the second transfer transistor TX2 may be driven during a second period different from the first period, etc. In addition, the first transfer control signal TS1 may be activated before the second transfer control signal TS2, and thereafter, the first transfer control signal TS1 may be activated once more when the second transfer control signal TS2 is activated, but is not limited thereto. That is, in the pre-shutter period t1 to t2, the first transfer control signal TS1 may be activated first, and then the first and second transfer control signals TS1 and TS2 may be activated together, etc.

At the sixth to seventh time points t6 to t7, the operation of the control signals may be similar to that in the pre-shutter period t1 to t2, but is not limited thereto. In detail, as the first and second transfer control signals TS1 and TS2 are sequentially activated, the first and second transfer transistors TX1 and TX2 may be sequentially turned on, etc. For example, the first transfer control signal TS1 may be activated before the second transfer control signal TS2, and then may be activated once more when the second transfer control signal TS2 is activated, etc.

Referring to FIG. 9 as an example, in the pre-shutter period t1 to t2, the first and second transfer control signals TS1 and TS2 may be simultaneously activated. Accordingly, the first and second transfer transistors TX1 and TX2 may be simultaneously turned on. That is, the first and second transfer transistors TX1 and TX2 may be driven during the first period. Meanwhile, in the pre-shutter period t1 to t2, the first and second transfer control signals TS1 and TS2 may be activated a plurality of times. In this case, the timing at which the first and second transfer control signals TS1 and TS2 are activated may be the same, but is not limited thereto. Accordingly, the first and second transfer transistors TX1 and TX2 may be simultaneously turned on a plurality of times, etc.

At the sixth to seventh time points t6 to t7, the operation of the control signals may be similar to that in the pre-shutter period t1 to t2, but is not limited thereto. In detail, as the first and second transfer control signals TS1 and TS2 are simultaneously activated, the first and second transfer transistors TX1 and TX2 may be simultaneously turned on. For example, the first transfer control signal TS1 may be activated before the second transfer control signal TS2, and then may be activated once more when the second transfer control signal TS2 is activated, but the example embodiments are not limited thereto.

Figure 10:
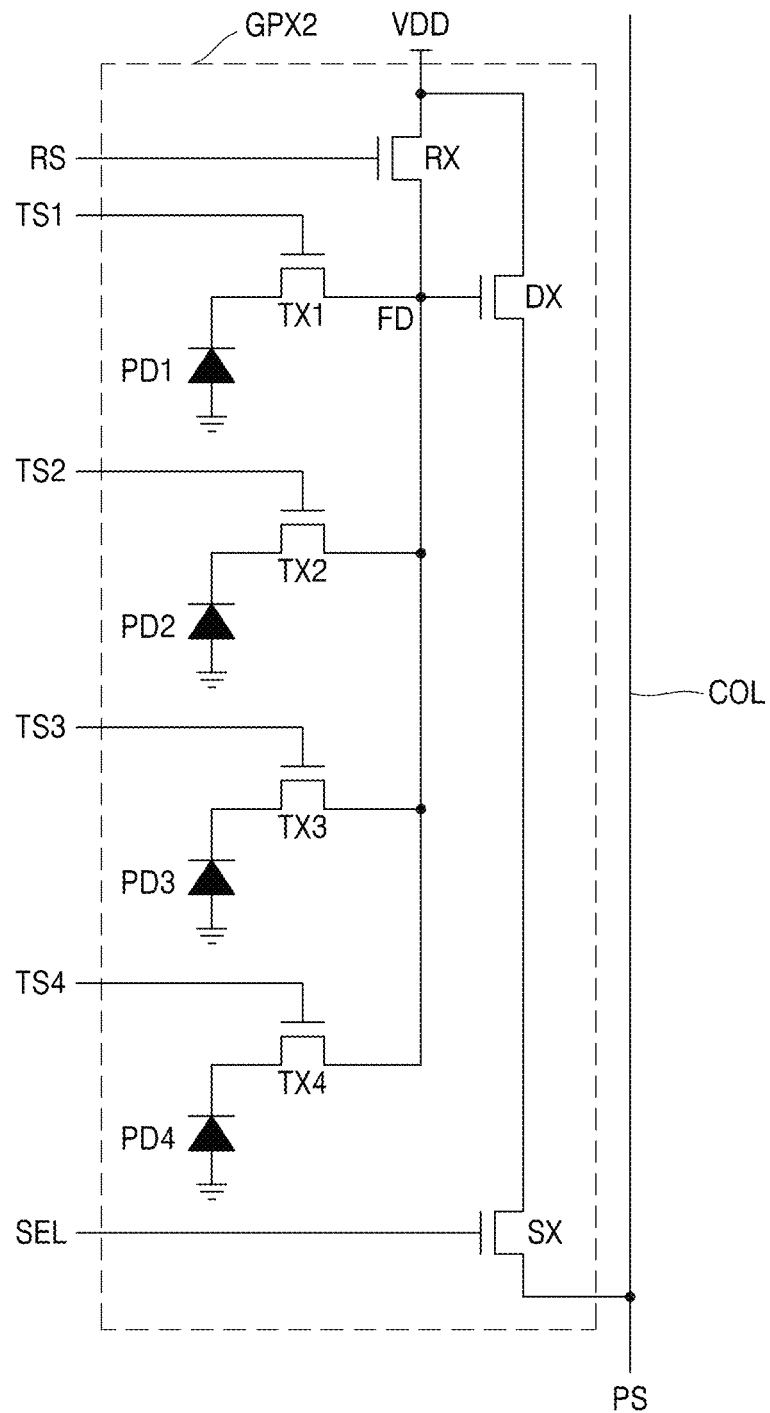
FIG. 10 is a circuit diagram of a pixel according to at least one example embodiment of the inventive concepts.

FIG. 10 is a circuit diagram of a pixel according to at least one example embodiment of the inventive concepts.

Referring to FIG. 10, the active pixel 111 and/or the optical black pixel 112 may include a second pixel group GPX2 having a shared structure, and the second pixel group GPX2 may include first to fourth pixels having a shared structure, but the example embodiments are not limited thereto, and for example may include a greater or lesser number of active pixels, optical black pixels, pixels within each pixel group, and/or pixel groups, etc.

The first pixel of the second pixel group GPX2 may include a first photodiode PD1, a first transfer transistor TX1, a selection transistor SX, a drive transistor DX, and/or a reset transistor RX, etc., but is not limited thereto. The first transfer transistor TX1 may be controlled by a first transfer control signal TS1. The second pixel of the second pixel group GPX2 may include a second photodiode PD2, a second transfer transistor TX2, the selection transistor SX, the drive transistor DX, and/or the reset transistor RX, etc., but is not limited thereto. The second transfer transistor TX2 may be controlled by a second transfer control signal TS2. The third pixel of the second pixel group GPX2 may include a third photodiode PD3, a third transfer transistor TX3, the selection transistor SX, the drive transistor DX, and/or the reset transistor RX, etc., but is not limited thereto. The third transfer transistor TX3 may be controlled by a third transfer control signal TS3. The fourth pixel of the second pixel group GPX2 may include a fourth photodiode PD4, a fourth transfer transistor TX4, the selection transistor SX, the drive transistor DX, and/or the reset transistor RX, etc., but is not limited thereto. The fourth transfer transistor TX4 may be controlled by a fourth transfer control signal TS4. The first to fourth pixels may share a floating diffusion FD, and may share the selection transistor SX, the drive transistor DX, and the reset transistor RX, but the example embodiments are not limited thereto.

Figure 11:
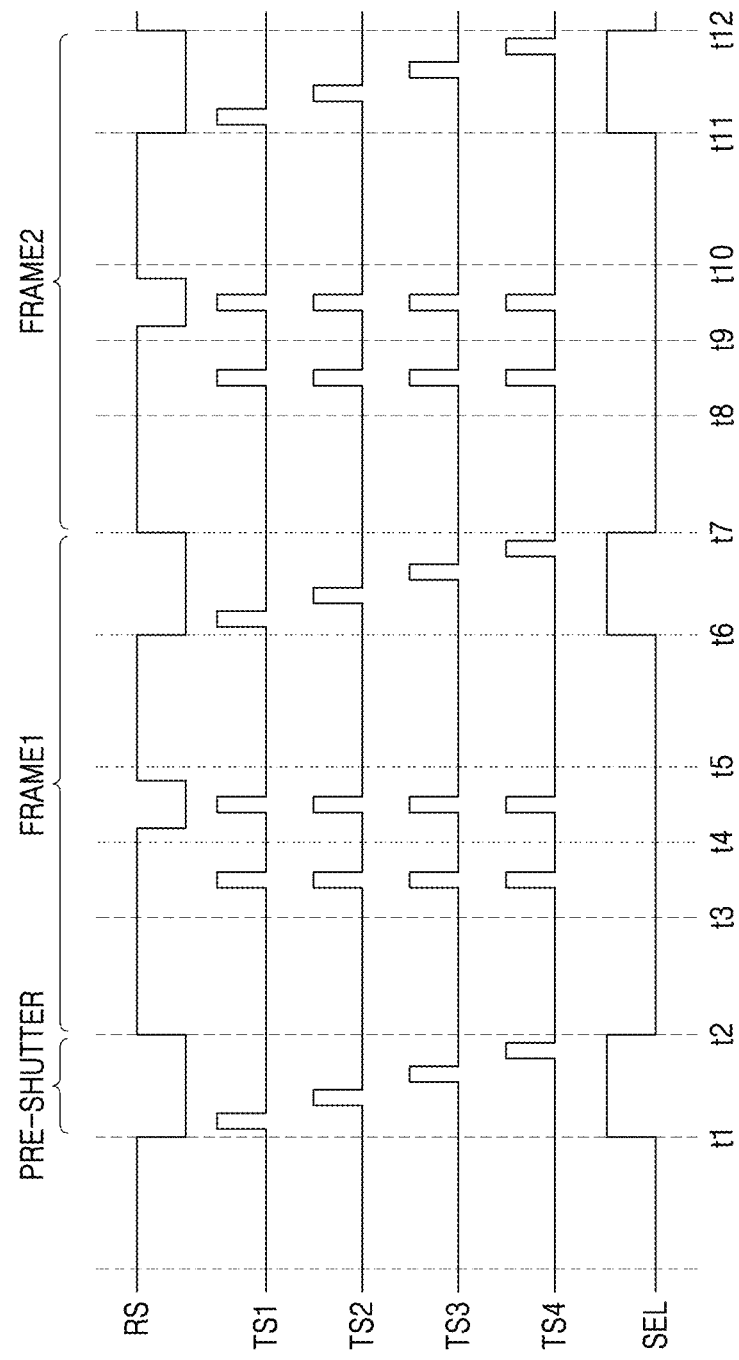
FIGS. 11 and 12 are timing diagrams illustrating control signals according to at least one example embodiment of the inventive concepts.
Figure 12:
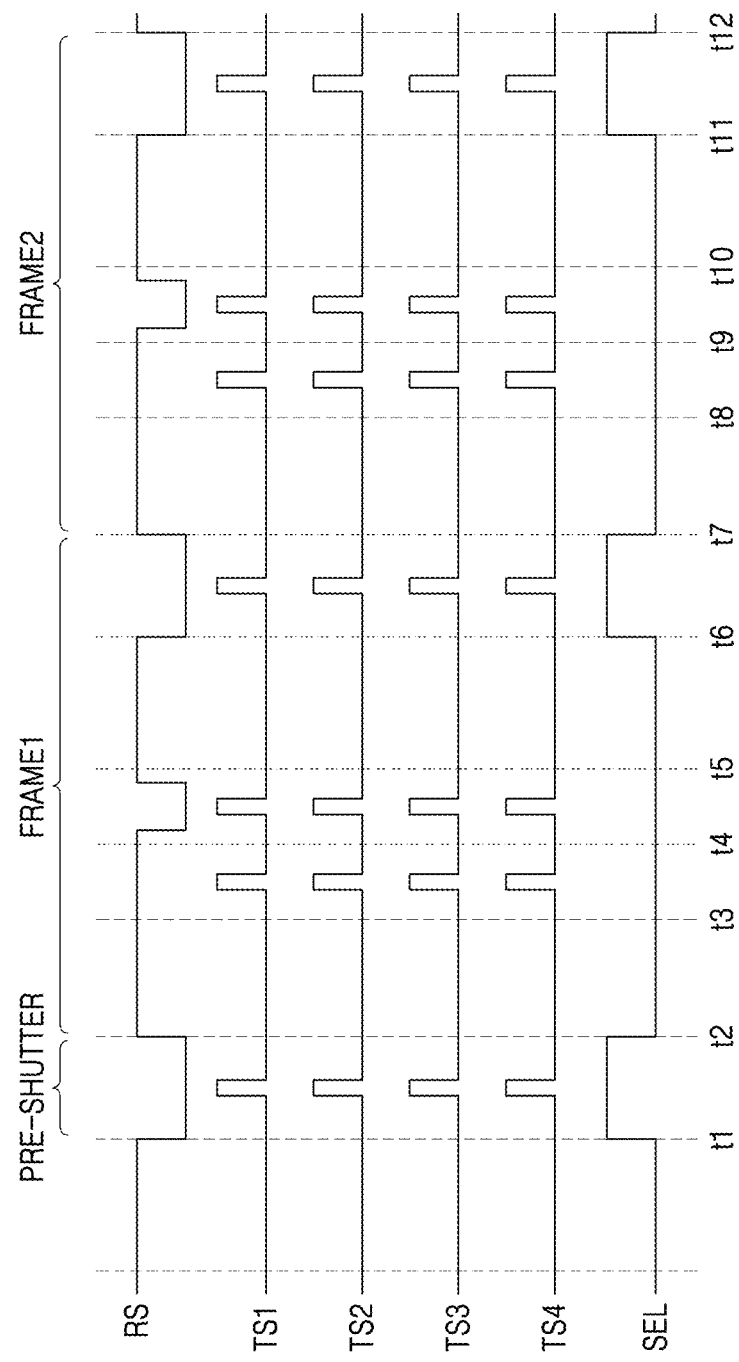

FIGS. 11 and 12 are timing diagrams illustrating control signals according to at least one example embodiment of the inventive concepts. The timing diagrams may represent control signals for the second pixel group of FIG. 10, but are not limited thereto. That is, the first to fourth transfer control signals TS1 to TS4 may control a photodiode of a pixel that is not a shared structure.

Referring to FIGS. 11 and 12 together, operations of the control signals may be similar to, for example, those of FIGS. 8 and 9, and the descriptions already given are omitted, and descriptions are mainly of a pre-shutter period t1 to t2 and the sixth to seventh time points t6 to t7.

In the pre-shutter period t1 to t2, the reset control signal RS may be deactivated, the first to fourth transfer control signals TS1 to TS4 may be activated, and the selection signal SEL may be activated. Accordingly, the reset transistor RX may be turned off, and the first to fourth transfer transistors TX1 to TX4 and the selection transistor SX may be turned on.

According to at least one example embodiment, referring to FIG. 11, in the pre-shutter period t1 to t2, the first to fourth transmission control signals TS1 to TS4 may be sequentially activated. Accordingly, the first to fourth transfer transistors TX1 to TX4 may be sequentially turned on. That is, the first transfer transistor TX1 may be driven in the first period, the second transfer transistor TX2 may be driven in the second period, the third transfer transistor TX3 may be driven in the third period, and the fourth transfer transistor TX4 may be driven in the fourth period, etc.

At the sixth to seventh time points t6 to t7, the operation of the control signals may be similar to that in the pre-shutter period t1 to t2, but is not limited thereto. For example, as the first to fourth transfer control signals TS1 to TS4 are sequentially activated, the first to fourth transfer transistors TX1 to TX4 may be sequentially turned on, etc.

According to at least one example embodiment, referring to FIG. 12, in the pre-shutter period t1 to t2, the first to fourth transmission control signals TS1 to TS4 may be simultaneously activated. Accordingly, the first to fourth transfer transistors TX1 to TX4 may be simultaneously turned on. That is, the first to fourth transfer transistors TX1 to TX4 may be driven during the first period.

At the sixth to seventh time points t6 to t7, the operation of the control signals may be similar to that in the pre-shutter period t1 to t2, but is not limited thereto. For example, as the first to fourth transfer control signals TS1 to TS4 are simultaneously activated, the first to fourth transfer transistors TX1 to TX4 may be simultaneously turned on.

Figure 13:
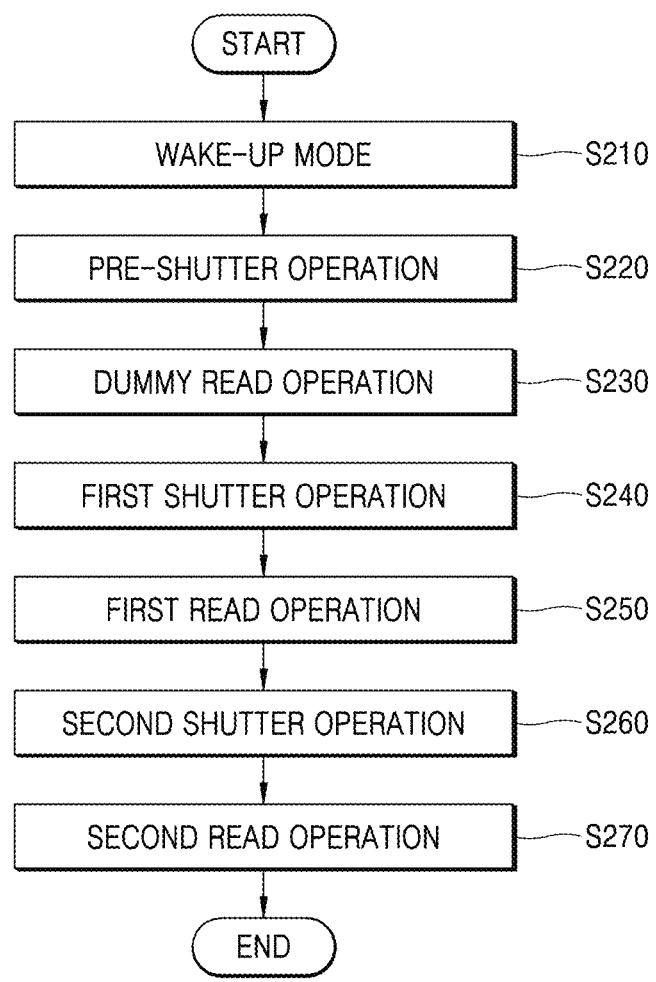
FIG. 13 is a flowchart illustrating a method of operating an image sensor according to at least one example embodiment of the inventive concepts.

FIG. 13 is a flowchart illustrating an operation of an image sensor according to at least one example embodiment of the inventive concepts. The operation of the image sensor 100 may be similar to that of FIG. 3, and the descriptions already given are omitted, but the example embodiments are not limited thereto.

Referring to FIG. 13, in operation S210, the image sensor 100 may operate in a wake-up mode, but the example embodiments are not limited thereto, and for example, operation S210 may be omitted if the image sensor 100 is not in a power save mode and/or sleep mode, etc. In operation S220, the controller 120 of the image sensor 100 may transmit a pre-shutter driving signal to the row driver 140 and/or pixel array 110 of the image sensor 100 to cause the pixel array 110 to perform a pre-shutter operation.

In operation S230, the controller 120 may transmit a dummy read driving signal to the row driver 140 and/or pixel array 110 of the image sensor 100 to cause the pixel array 110 to perform a dummy read operation of reading a dummy signal generated through the pre-shutter operation. The image sensor 100 may output the dummy signal to the processor 12 of FIG. 1, but the example embodiments are not limited thereto. For example, the image sensor 100 may output, together with the dummy signal, information indicating that the dummy signal is a signal generated through the pre-shutter operation, etc. Meanwhile, the image sensor 100 may omit the output of the dummy signal.

Because operations S240 to S270, which are a main shutter operation and a main read operation, are similar to operations S130 to S160 of FIG. 3, detailed descriptions thereof are omitted, but the example embodiments are not limited thereto.

Figure 14:
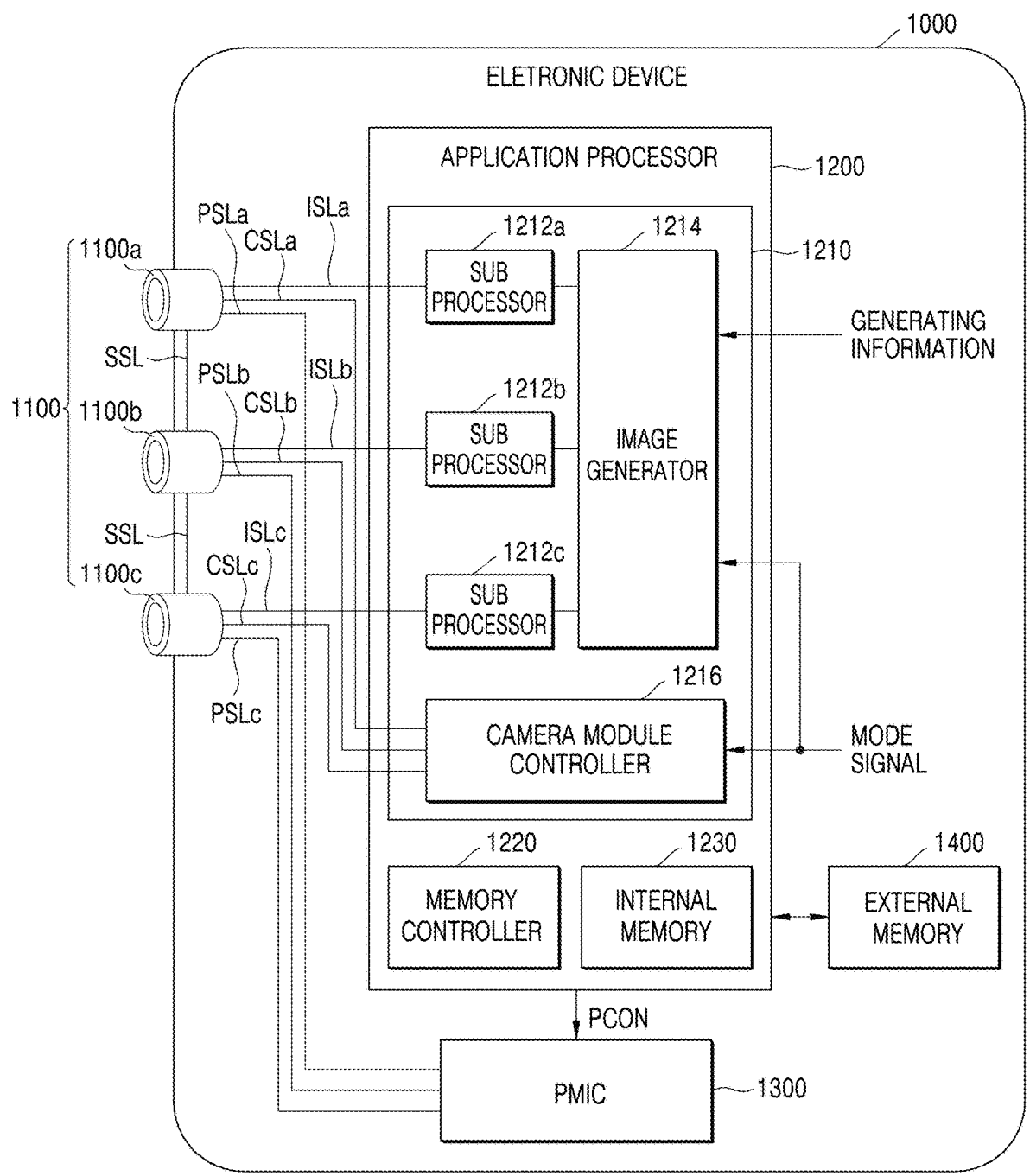
FIG. 14 is a block diagram of an electronic device including a multi-camera module according to at least one example embodiment.
Figure 15:
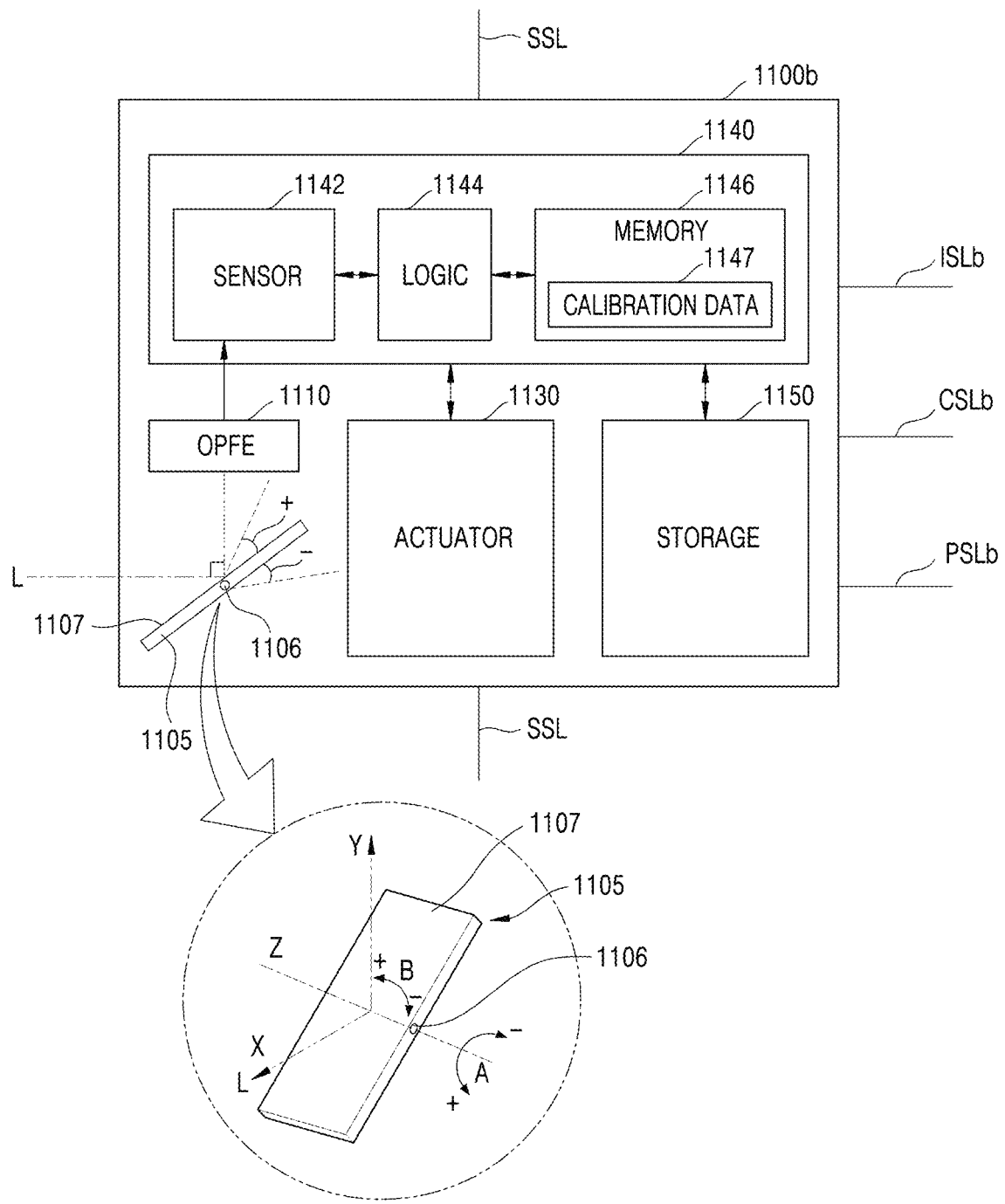
FIG. 15 is a detailed block diagram of the camera module of FIG. 14 according to at least one example embodiment.

FIG. 14 is a block diagram of an electronic device including a multi-camera module according to at least one example embodiment. FIG. 15 is a detailed block diagram of the camera module of FIG. 14 according to at least one example embodiment.

Referring to FIG. 14, an electronic device 1000 may include a camera module group 1100, an application processor 1200 (e.g., processing circuitry, etc.), a PMIC 1300, and/or an external memory 1400, etc., but is not limited thereto, and for example, may include a greater or lesser number of constituent components, etc.

The camera module group 1100 may include a plurality of camera modules, e.g., camera modules 1100a, 1100b, and/or 1100c, etc., but is not limited thereto, and for example, may include a greater or lesser number of camera modules, etc. Although the drawing shows at least one example embodiment in which three camera modules 1100a, 1100b, and 1100c are included, the example embodiments are not limited thereto. In some example embodiments, the camera module group 1100 may be modified to include only two camera modules, four or more camera modules, etc. Also, in some example embodiments, the camera module group 1100 may be modified to include n (n is a natural number greater than or equal to 4) camera modules, etc.

Hereinafter, a detailed configuration of the camera module 1100b will be described in more detail with reference to FIG. 15, but the following description may be equally applied to the other camera modules 1100a and 1100b according to at least one example embodiment.

Referring to FIG. 15, the camera module 1100b may include a prism 1105, an optical path folding element (OPFE) 1110, an actuator 1130, an image sensing device 1140, and/or a storage unit 1150 (e.g., storage device and/or non-transitory storage medium), etc., but the example embodiments are not limited thereto.

The prism 1105 may include a reflective surface 1107 of a light reflective material to modify the path of the light L incident from the outside.

In some example embodiments, the prism 1105 may change the path of the light L incident in a first direction X to a second direction Y perpendicular to the first direction X. In addition, the prism 1105 may rotate the reflective surface 1107 of the light reflective material in an A direction about a central axis 1106, and/or may rotate the central axis 1106 in a B direction to change the path of the light L incident in the first direction X to the second vertical direction Y, etc. At this time, the OPFE 1110 may also move in a third direction Z perpendicular to the first direction X and the second direction Y.

In some example embodiments, as shown, the maximum rotation angle of the prism 1105 in the A direction may be, for example, 15 degrees or less in the positive (+) A direction, and may be greater than 15 degrees in the negative (−) A direction, but the example embodiments are not limited thereto.

In some example embodiments, the prism 1105 may be moved in the positive (+) or negative (−) B direction around, for example, 20 degrees, or between 10 degrees and 20 degrees, or between 15 degrees and 20 degrees, etc. Here, the moving angle may move at the same angle in the plus (+) or minus (−) B direction, and/or move to a nearly similar angle within a range of about 1 degree.

In some example embodiments, the prism 1105 may move the reflective surface 1107 of the light reflective material in a third direction (e.g., the Z direction) parallel to an extension direction of the central axis 1106.

The OPFE 1110 may include, for example, an optical lens including m (here, m is a natural number) number of groups. The m lenses may move in the second direction Y to change an optical zoom ratio of the camera module 1100b. For example, assuming that the basic optical zoom ratio of the camera module 1100b is A, when the m optical lenses included in the OPFE 1110 are moved, the optical zoom ratio of the camera module 1100b may be changed to an optical zoom ratio of 3 A, 5 A, and/or 7 A or more, but the example embodiments are not limited thereto.

The actuator 1130 may move the OPFE 1110 and/or an optical lens (hereinafter, referred to as an optical lens) to a desired and/or specific position, etc. For example, the actuator 1130 may adjust the position of the optical lens so that an image sensor 1142 is located at a focal length of the optical lens for accurate sensing, etc.

The image sensing device 1140 may include the image sensor 1142, a control logic 1144, and/or a memory 1146 (e.g., memory device), etc., but the example embodiments are not limited thereto, and for example, the image sensing device 1140 may include a greater or lesser number of constituent components, etc. The image sensor 1142 may sense an image of a sensing target using light L provided through an optical lens. The control logic 1144 may control the overall operation of the camera module 1100b. For example, the control logic 1144 may control the operation of the camera module 1100b depending on a control signal provided through a control signal line CSLb, etc.

The image sensor 1142 according to at least one example embodiment of the inventive concepts may correspond to the image sensor 100 in FIG. 1 described above with reference to FIGS. 1 to 13, and the control logic 1144 may correspond to the controller 120 of FIG. 1 described above with reference to FIGS. 1 to 13, but the example embodiments are not limited thereto.

The memory 1146 may store information necessary for the operation of the camera module 1100b, such as calibration data 1147. The calibration data 1147 may include information necessary for the camera module 1100b to generate image data using the light L provided from the outside and/or an external source, etc. The calibration data 1147 may include, for example, information about a degree of rotation described above, information about a focal length, information about an optical axis, and the like. When the camera module 1100b is implemented in the form of a multi-state camera in which the focal length is changed depending on the position of the optical lens, the calibration data 1147 may include a focal length value for each position (and/or state) of the optical lens and information related to auto focusing.

The storage unit 1150 (e.g., storage device, non-transitory storage medium, etc.) may store image data sensed by the image sensor 1142. The storage unit 1150 may be outside the image sensing device 1140, and may be implemented in a stacked form with a sensor chip constituting the image sensing device 1140, but the example embodiments are not limited thereto. In some example embodiments, the storage unit 1150 may be implemented as an electrically erasable programmable read-only memory (EEPROM), but the example embodiments are not limited thereto.

Referring to FIGS. 14 and 15 together, in some example embodiments, each of the plurality of camera modules 1100a, 1100b, and/or 1100c, etc., may include an actuator 1130, but the example embodiments are not limited thereto. Accordingly, each of the plurality of camera modules 1100a, 1100b, and/or 1100c, etc., may include the same and/or different calibration data 1147 depending on the operation of the actuator 1130 included therein.

In some example embodiments, one camera module (for example, 1100b) among the plurality of camera modules 1100a, 1100b, and/or 1100c, etc., is a folded lens type camera module including the prism 1105 and the OPFE 1110 as described above, and the remaining camera modules (e.g., 1100a and 1100b) may be a vertical type camera module that does not include the prism 1105 and the OPFE 1110, but the example embodiments are not limited thereto.

In some example embodiments, one camera module (for example, 1100c) among the plurality of camera modules 1100a, 1100b, and/or 1100c, etc., is, for example, a vertical type depth camera for extracting depth information using infrared ray (IR), etc. In this case, the application processor 1200 may generate a 3D depth image by merging the image data provided from the depth camera with the image data provided from another camera module (for example, 1100a or 1100b), but the example embodiments are not limited thereto.

In some example embodiments, at least two camera modules (for example, 1100a, 1100b) among the plurality of camera modules 1100a, 1100b, and/or 1100c, etc., may have different fields of view, etc. In this case, for example, optical lenses of at least two camera modules (for example, 1100a, and 1100b) among the plurality of camera modules 1100a, 1100b, and/or 1100c, etc., may be different from each other, but the example embodiments are not limited thereto.

Also, in some example embodiments, the field of view of each of the plurality of camera modules 1100a, 1100b, and/or 1100c, etc., may be different from one another. In this case, the optical lenses included in each of the plurality of camera modules 1100a, 1100b, and 1100c may also be different, but the example embodiments are not limited thereto.

In some example embodiments, each of the plurality of camera modules 1100a, 1100b, and 1100c may be physically separated from each other. That is, a plurality of camera modules 1100a, 1100b, and/or 1100c, etc., do not divide and use the sensing area of one image sensor 1142 (e.g., a single image sensor 1142), but an independent image sensor 1142 may be inside each of the plurality of camera modules 1100a, 1100b, and/or 1100c, etc., but the example embodiments are not limited thereto.

Referring back to FIG. 14, the application processor 1200 may include processing circuitry, such as at least one image processor 1210, at least one memory controller 1220, and/or an internal memory 1230, etc., but is not limited thereto, and for example, may include a greater or lesser number of constituent components, etc. The application processor 1200 may be implemented separately from the plurality of camera modules 1100a, 1100b, and 1100c, etc., but is not limited thereto. For example, the application processor 1200 and the plurality of camera modules 1100a, 1100b, and 1100c, etc., may be implemented separately as separate semiconductor chips, but the example embodiments are not limited thereto. According to some example embodiments, the application processor 1200 (e.g., processing circuitry) may include hardware, such as processors, processor cores, logic circuits, storage devices, etc.; a hardware/software combination such as at least one processor core executing software and/or executing any instruction set, etc.; or a combination thereof. For example, the processing circuitry more specifically may include, but is not limited to, a field programmable gate array (FPGA), a programmable logic unit, an application-specific integrated circuit (ASIC), s System-on-Chip (SoC), etc.

The image processor 1210 may include a plurality of sub image processors 1212a, 1212b, and/or 1212c, etc., an image generator 1214, and/or a camera module controller 1216, etc., but is not limited thereto.

The image processor 1210 may include a plurality of sub-image processors 1212a, 1212b, and/or 1212c, etc., corresponding to the number of camera modules 1100a, 1100b, and 1100c, but the example embodiments are not limited thereto.

Image data generated from each of the camera modules 1100a, 1100b, and/or 1100c, etc., may be provided to the corresponding sub-image processors 1212a, 1212b, and/or 1212c, etc., through a plurality of image signal lines ISLa, ISLb, and/or ISLc, etc., separated from each other. For example, the image data generated by the camera module 1100a may be provided to the sub-image processor 1212a through the image signal line ISLa, the image data generated by the camera module 1100b may be provided to the sub-image processor 1212b through the image signal line ISLb, and/or the image data generated by the camera module 1100c may be provided to the sub-image processor 1212c through the image signal line ISLc, etc., but are not limited thereto. Such image data transmission may be performed using, for example, a camera serial interface (CSI) based on a mobile industry processor interface (MIPI), but the example embodiments are not limited thereto.

In some example embodiments, a single sub-image processor may be arranged to correspond to a plurality of camera modules, but the example embodiments are not limited thereto, and for example, a single sub-image processor may correspond to a single camera module, etc. For example, the sub-image processor 1212a and the sub-image processor 1212c are not implemented separately from each other as shown, but may be integrated into a single sub-image processor, and the image data provided from the camera module 1100a and the camera module 1100c may be selected through a selection device (e.g., a multiplexer) and then provided to the integrated sub-image processor, etc., but the example embodiments are not limited thereto.

The image data provided to each of the sub-image processors 1212a, 1212b, and/or 1212c, etc., may be provided to the image generator 1214. The image generator 1214 may generate an output image using image data provided from each of the sub-image processors 1212a, 1212b, and/or 1212c, etc., depending on and/or based on image generating information and/or a mode signal.

According to at least one example embodiment, the image generator 1214 may generate an output image by merging at least some of the image data generated from the camera modules 1100a, 1100b, and/or 1100c, etc., having different fields of view depending on and/or based on the image generation information and/or the mode signal. Also, the image generator 1214 may generate an output image by selecting any one of the image data generated from the camera modules 1100a, 1100b, and/or 1100c, etc., having different fields of view depending on and/or image generation information and/or a mode signal.

In some example embodiments, the image generation information may include a zoom signal and/or zoom factor. Also, in some example embodiments, the mode signal may be, for example, a signal based on a mode selected by a user.

When the image generation information is a zoom signal (e.g., zoom factor) and each camera module 1100a, 1100b, and/or 1100c, etc., has a different viewing field (e.g., field of view), the image generator 1214 may perform different operations based on the type of the zoom signal. For example, when the zoom signal is the first signal, the image data output from the camera module 1100a and the image data output from the camera module 1100c are merged, and then, an output image may be generated using the merged image signal and the image data output from the camera module 1100b not used for merging, etc. In a case where the zoom signal is a second signal different from the first signal, the image generator 1214 may generate an output image by selecting any one of the image data output from each of the camera modules 1100a, 1100b, and/or 1100c, etc., without performing such image data merging. However, the example embodiments are not limited thereto, and a method of processing image data may be modified and implemented as needed.

In some example embodiments, the image generator 1214 may receive a plurality of pieces of image data having different exposure times from at least one of the plurality of sub-image processors 1212a, 1212b, and/or 1212c, etc., and may perform high dynamic range (HDR) processing on the plurality of pieces of image data, thereby generating merged image data having an increased dynamic range, etc.

The camera module controller 1216 may provide a control signal to each of the camera modules 1100a, 1100b, and/or 1100c, etc. The control signals generated from the camera module controller 1216 may be provided to the corresponding camera modules 1100a, 1100b, and/or 1100c, etc., through a plurality of control signal lines CSLa, CSLb, and/or CSLc, etc., separated from each other.

Any one of the plurality of camera modules 1100a, 1100b, and/or 1100c, etc., may be designated as a master camera (e.g., 1100b) based on image generation information and/or a mode signal including a zoom signal, and the remaining camera modules (e.g., 1100a and 1100c) may be designated as slave cameras, etc. Such information may be included in the control signals and provided to the corresponding camera modules 1100a, 1100b, and/or 1100c, etc., through the control signal lines CSLa, CSLb, and/or CSLc, etc., separated from each other.

A camera module operating as a master or a slave may be changed depending on and/or based on the zoom factor and/or an operation mode signal. For example, when the field of view of the camera module 1100a is wider than that of the camera module 1100b and the zoom factor of the camera module 1100a is smaller than that of the camera module 1100b, the camera module 1100b may operate as a master and the camera module 1100a may operate as a slave, but the example embodiments are not limited thereto. Conversely, the zoom factor of the camera module 1100a is greater than that of the camera module 1100b, the camera module 1100a may operate as a master and the camera module 1100b may operate as a slave, but the example embodiments are not limited thereto.

In some example embodiments, the control signal provided from the camera module controller 1216 to each of the camera modules 1100a, 1100b, and/or 1100c, etc., may include a sync enable signal, but is not limited thereto. For example, when the camera module 1100b is a master camera and the camera modules 1100a and 1100c are slave cameras, the camera module controller 1216 may transmit the sync enable signal to the camera module 1100b, etc. The camera module 1100b receiving the sync enable signal may generate a sync signal based on the received sync enable signal, and may provide the generated sync signal to the camera modules 1100a and 1100c through the sync signal line SSL. The camera module 1100b and the camera modules 1100a and 1100c may be synchronized with the sync signal to transmit image data to the application processor 1200.

In some example embodiments, the control signals provided from the camera module controller 1216 to the plurality of camera modules 1100a, 1100b, and/or 1100c, etc., may include mode information depending on the mode signal. Based on the mode information, the plurality of camera modules 1100a, 1100b, and/or 1100c, etc., may operate in a first operation mode and/or a second operation mode in relation to a sensing speed, but are not limited thereto.

The plurality of camera modules 1100a, 1100b, 1100c, etc., may generate an image signal at a first speed (e.g., generate an image signal at a first frame rate) in the first operation mode to encode the generated image signal at a second speed higher than the first speed (e.g., encode the image signal at a second frame rate higher than the first frame rate), and may transmit the encoded image signal to the application processor 1200, etc. In this case, the second speed may be, for example, 30 times or less of the first speed, but the example embodiments are not limited thereto.

The application processor 1200 may store the received image signal, that is, the encoded image signal, in the memory 1230 provided therein and/or the external memory 1400 outside (e.g., external to) the application processor 1200, thereafter, read and then decode the encoded image signal from the memory 1230 and/or the external memory 1400, and display image data generated based on the decoded image signal. For example, a corresponding sub-processor among the plurality of sub-processors 1212a, 1212b, and/or 1212c, etc., of the image processor 1210 may perform decoding, and may also perform image processing on the decoded image signal, but the example embodiments are not limited thereto.

The plurality of camera modules 1100a, 1100b, and/or 1100c, etc., may generate an image signal at a third speed lower than the first speed (e.g., generate an image signal at a third frame rate lower than the first frame rate) in the second operation mode and transmit the image signal to the application processor 1200, but are not limited thereto. The image signal provided to the application processor 1200 may be an unencoded signal, but is not limited thereto. The application processor 1200 may perform image processing on the received image signal and/or store the image signal in the memory 1230 and/or the external memory 1400, etc.

The PMIC 1300 may supply power, for example, a power supply voltage, to each of the plurality of camera modules 1100a, 1100b, and/or 1100c, etc. For example, the PMIC 1300, under the control of the application processor 1200, may supply first power to the camera module 1100a through a power signal line PSLa, supply second power to the camera module 1100b through a power signal line PSLb, and supply third power to the camera module 1100c through a power signal line PSLc.

The PMIC 1300 may generate power corresponding to each of the plurality of camera modules 1100a, 1100b, and/or 1100c, etc., in response to the power control signal PCON from the application processor 1200, and also adjust the level of power. The power control signal PCON may include a power adjustment signal for each operation mode of the plurality of camera modules 1100a, 1100b, and/or 1100c, etc. For example, the operation mode may include a low power mode, and in this case, the power control signal PCON may include information about a camera module operating in the low power mode and a set power level. The levels of power provided to each of the plurality of camera modules 1100a, 1100b, and/or 1100c, etc., may be the same or different from each other. Also, the level of power may be changed dynamically.

While various example embodiments of the inventive concepts have been particularly shown and described with reference to the drawings, it will be understood that various changes in form and details may be made therein without departing from the spirit and scope of the following claims.

What is claimed is:

1. An image sensor comprising:
a pixel array including a plurality of pixels, each of the plurality of pixels including a photodiode;
a controller configured to generate a pre-shutter driving signal associated with a pre-shutter operation to the pixel array, the pre-shutter driving signal generated before a first shutter operation and a first read operation corresponding to photographing a first frame is performed on the pixel array;
a row driver configured to drive first control signals to the pixel array based on the pre-shutter driving signal, the first control signals associated with the pre-shutter operation; and
the pixel array is configured to perform the pre-shutter operation in response to the first control signals, wherein levels of the first control signals correspond to levels of second control signals, the second control signals associated with the first read operation; and
a read circuit configured to read a dummy signal generated by the pixel array during the pre-shutter operation before performing a non-effective integration time (NIT) operation, the first shutter operation and the first read operation, the NIT operation being a time period where electrons do not move from the plurality of photodiodes to a floating diffusion of the image sensor.

2. The image sensor of claim 1, wherein
the controller is further configured to generate a first shutter operation driving signal and a first read operation driving signal for the first frame; and
the pixel array is further configured to perform the first shutter operation in response to the first shutter operation driving signal, perform the first read operation in response to the first read operation driving signal, and output a first pixel signal;
the controller is further configured to generate a second shutter operation driving signal; and
the pixel array is further configured to perform a second shutter operation corresponding to photographing a second frame in response to the second shutter operation driving signal.

3. The image sensor of claim 2, wherein the row driver is further configured to:
generate the first control signals, the generating the first control signals including generating reset control signals, transfer control signals, and selection signals; and
provide the reset control signals, the transfer control signals, and the selection signals to the pixel array to perform the pre-shutter operation.

4. The image sensor of claim 2, wherein
the plurality of pixels includes an active pixel and an optical black pixel; and
the image sensor further comprises a signal processor, the signal processor configured to generate a differential signal based on a difference between a pixel signal generated from the active pixel and a reference signal generated from the optical black pixel after the pre-shutter operation, the pixel signal generated from the active pixel based on residual electrons included in the active pixel.

5. The image sensor of claim 2, wherein a first frame period for the first frame includes the NIT operation, a shutter period, and a read period, the shutter period corresponding to a time period for performing the first shutter operation, and the read period corresponding to a time period for performing the first read operation.

6. The image sensor of claim 1, wherein
the plurality of pixels includes at least a first pixel and a second pixel;
the first pixel includes a first photodiode of the plurality of photodiodes and a first transfer transistor configured to control the first photodiode;
the second pixel includes a second photodiode of the plurality of photodiodes and a second transfer transistor configured to control the second photodiode; and
the first pixel and the second pixel share a first floating diffusion.

7. The image sensor of claim 6, wherein the controller is further configured to generate the pre-shutter driving signal to drive the first transfer transistor during a first period and drive the second transfer transistor during a second period different from the first period.

8. The image sensor of claim 6, wherein the controller is further configured to generate the pre-shutter driving signal to drive the first and second transfer transistors during a first period.

9. The image sensor of claim 1, wherein the dummy signal includes information indicating that the dummy signal is a signal generated during the pre-shutter operation.

10. The image sensor of claim 1, wherein the pixel array is configured to operate in a full-mode.

11. The image sensor of claim 1, wherein the pixel array is configured to operate in a binning-mode.

12. An operating method of an image sensor, the operating method comprising:
receiving a first command, the first command being a command for capturing at least a first frame;
switching the image sensor to a wake-up mode from a sleep mode in response to the first command;
performing a pre-shutter operation on a pixel array, the performing the pre-shutter operation including reading a dummy signal generated by the pixel array during the pre-shutter operation before performing a main shutter operation and a main read operation for capturing the first frame, the pre-shutter operation performed in response to first control signals, levels of the first control signals corresponding to levels of second control signals, the second control signals corresponding to a main read operation of a plurality of pixels, each of the plurality of pixels including a photodiode; and
performing the main shutter operation and the main read operation using the image sensor in response to the pre-shutter operation, wherein
the main shutter operation includes a first shutter operation and a second shutter operation,
the main read operation including a first read operation and a second read operation, and
a non-effective integration time (NIT) operation of the first frame exists between the pre-shutter operation and the first shutter operation, the NIT operation being a time period where electrons do not move from the plurality of photodiodes to a floating diffusion of the image sensor.

13. The operating method of claim 12, wherein
the plurality of pixels includes at least a first pixel and a second pixel, the first pixel and the second pixel sharing a first floating diffusion; and
the performing of the pre-shutter operation includes sequentially driving a first transfer transistor of the first pixel and a second transfer transistor of the second pixel.

14. The operating method of claim 13, wherein the performing of the main shutter operation and the main read operation includes sequentially driving the first transfer transistor and the second transfer transistor.

15. The operating method of claim 12, wherein
the plurality of pixels includes at least a first pixel and a second pixel, the first pixel and the second pixel sharing a first floating diffusion; and
the performing of the pre-shutter operation includes simultaneously driving a first transfer transistor of the first pixel and a second transfer transistor of the second pixel.

16. The operating method of claim 15, wherein the performing of the main shutter operation and the main read operation includes simultaneously driving the first transfer transistor and the second transfer transistor.

17. An image sensor comprising:
a pixel array including a plurality of pixels, each of the plurality of pixels including a photodiode;
a row driver configured to generate driving signals for the plurality of pixels;
a controller configured to,
receive a request signal for capturing a plurality of frames from at least one processor, the plurality of frames including at least a first frame and a second frame,
generate a first control signal, a second control signal, and a third control signal; and
the pixel array configured to perform a pre-shutter operation on the plurality of pixels, output a dummy read driving signal corresponding to pixel values of the plurality of pixels in response to the first control signal, perform a dummy read operation in response to the dummy read driving signal, output a first pixel signal corresponding to pixel values of the plurality of pixels capturing the first frame in response to the second control signal, perform a first read operation in response to the first pixel signal, output a second pixel signal corresponding to pixel values of the plurality of pixels capturing the second frame in response to the third control signal, and perform a second read operation in response to the second pixel signal,
wherein
the dummy read driving signal is a signal generated by residual electrons in the pixel array,
the pixel array is configured to perform a first shutter operation and a second shutter operation, and
a non-effective integration time (NIT) operation of the first frame exists between the pre-shutter operation and the first shutter operation, the NIT operation being a time period where electrons do not move from the plurality of photodiodes to a floating diffusion of the image sensor.

18. The image sensor of claim 17, wherein the row driver is further configured to sequentially generate a plurality of transfer control signals for driving a transfer transistor of each of the plurality of pixels.

19. The image sensor of claim 17, wherein the row driver is further configured to simultaneously generate a plurality of transfer control signals for driving a transfer transistor of each of the plurality of pixels.

* * * * *